(12) United States Patent
Wagner

(10) Patent No.: US 9,175,489 B1
(45) Date of Patent: Nov. 3, 2015

(54) WATER MANAGEMENT SYSTEM

(71) Applicant: Robin Wagner, Glendale, AZ (US)

(72) Inventor: Robin Wagner, Glendale, AZ (US)

(73) Assignee: Ronald James Turnbow, Phoenix, AZ (US)

(*) Notice: Subject to any disclaimer, the term of this patent is extended or adjusted under 35 U.S.C. 154(b) by 251 days.

(21) Appl. No.: 13/848,451

(22) Filed: Mar. 21, 2013

Related U.S. Application Data

(63) Continuation-in-part of application No. 13/087,266, filed on Apr. 14, 2011, now abandoned.

(60) Provisional application No. 61/324,643, filed on Apr. 15, 2010.

(51) Int. Cl.
| | |
|---|---|
| *E04H 4/12* | (2006.01) |
| *C02F 1/46* | (2006.01) |
| *E04H 4/16* | (2006.01) |
| *C02F 1/461* | (2006.01) |

(52) U.S. Cl.
CPC .............. *E04H 4/16* (2013.01); *C02F 1/46109* (2013.01); *E04H 4/1281* (2013.01)

(58) Field of Classification Search
CPC ...... E04H 4/16; E04H 4/1281; C02F 1/46109
USPC ........... 210/167.11, 167.12; 204/196.02, 225, 204/660, 661, 665, 666, 668
See application file for complete search history.

(56) References Cited

U.S. PATENT DOCUMENTS

| | | | |
|---|---|---|---|
| 3,563,879 A * | 2/1971 | Richards et al. | ......... 210/167.11 |
| 3,926,802 A | 12/1975 | Hedgpeth | |
| 3,948,632 A | 4/1976 | Ritchey | |
| 4,098,602 A | 7/1978 | Seymour et al. | |
| 4,282,104 A | 8/1981 | Pacini et al. | |
| 5,332,511 A | 7/1994 | Gay et al. | |
| 5,373,025 A | 12/1994 | Gay | |
| 5,541,150 A | 7/1996 | Garris | |
| 6,387,415 B1 | 5/2002 | Garris | |
| 6,824,794 B2 | 11/2004 | Ring et al. | |

FOREIGN PATENT DOCUMENTS

DE 10134403 A1 * 1/2003

* cited by examiner

*Primary Examiner* — Fred Prince
(74) *Attorney, Agent, or Firm* — Schmeiser, Olsen & Watts LLP

(57) ABSTRACT

A water managing system includes a pool, and a gas generating system which includes first and second electrode assemblies. A reactant gas is formed in response to establishing a potential difference between the first and second electrode assemblies with automatically adjusting electrodes. A pool pump is in fluid communication with the pool, and a pool filter in fluid communication with the pool and pool pump. The reactant gas flows through a strainer drain of the pool pump and to the pool filter.

20 Claims, 32 Drawing Sheets

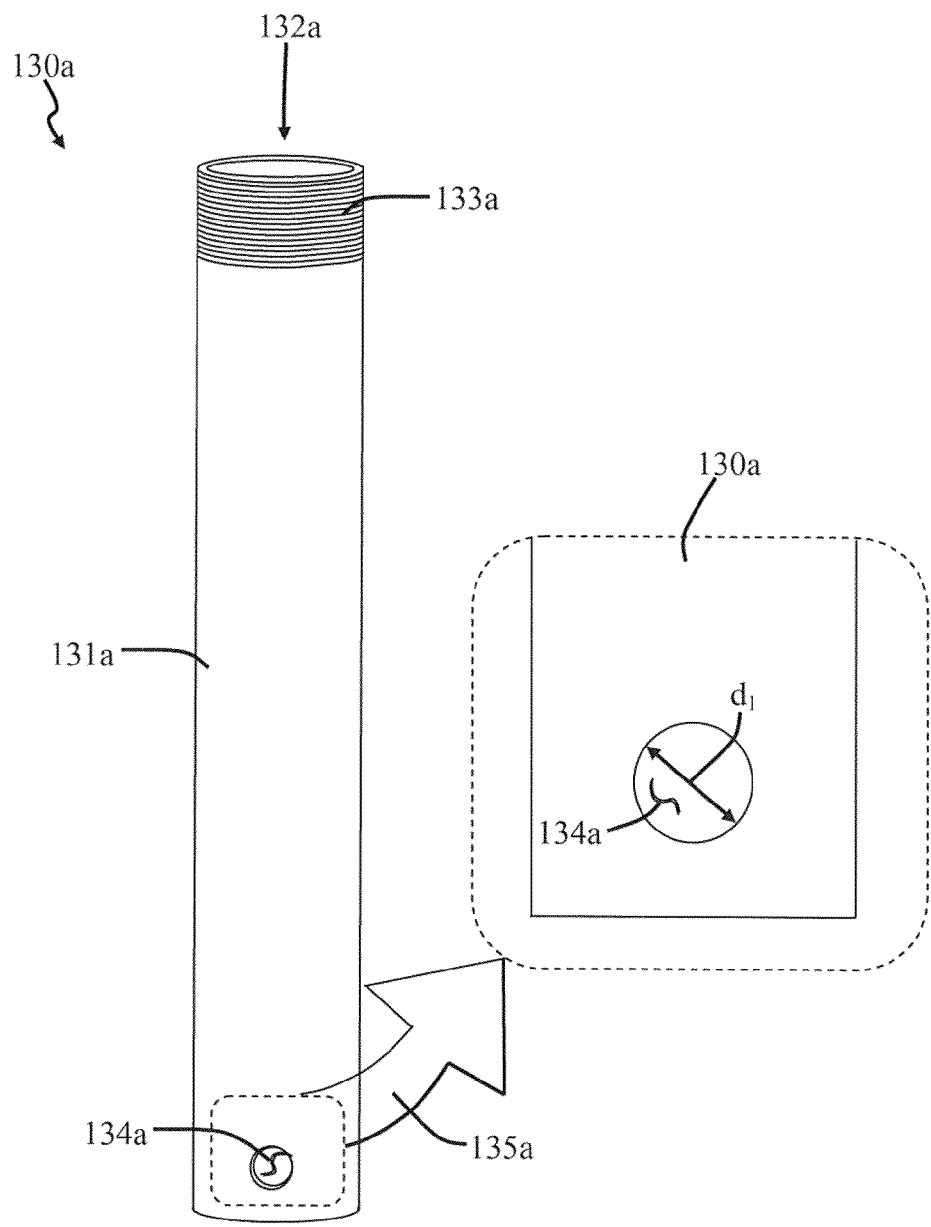

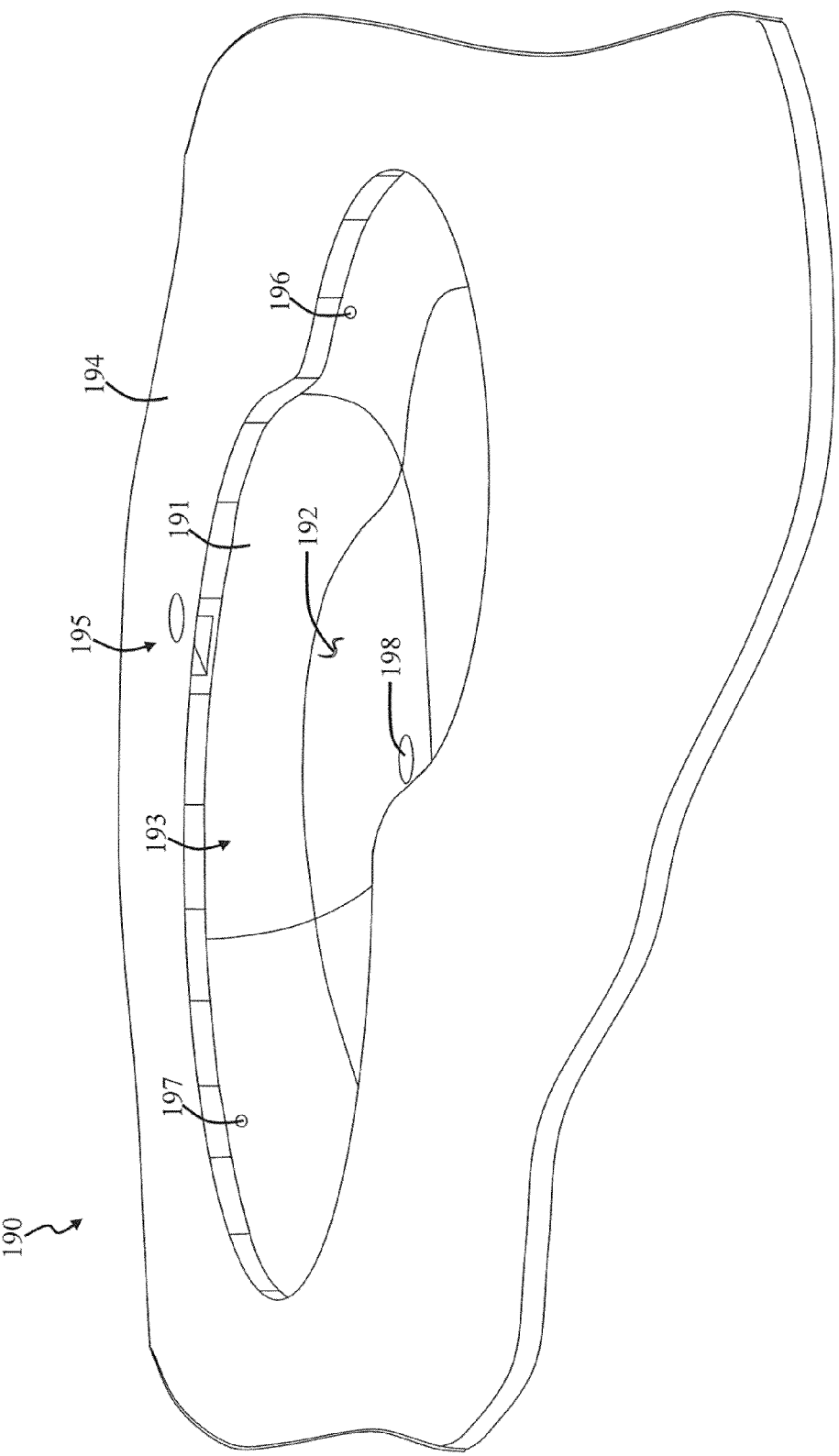

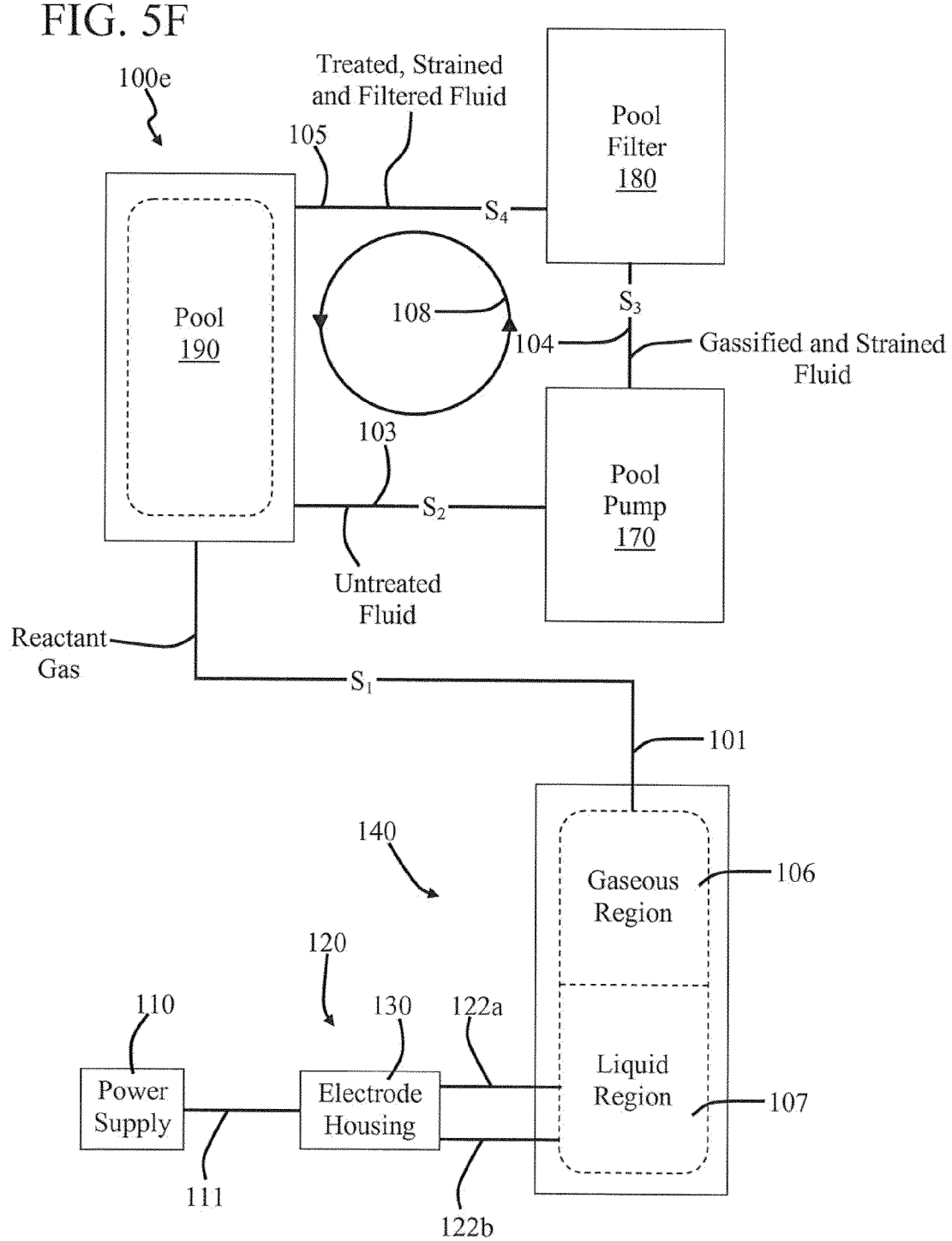

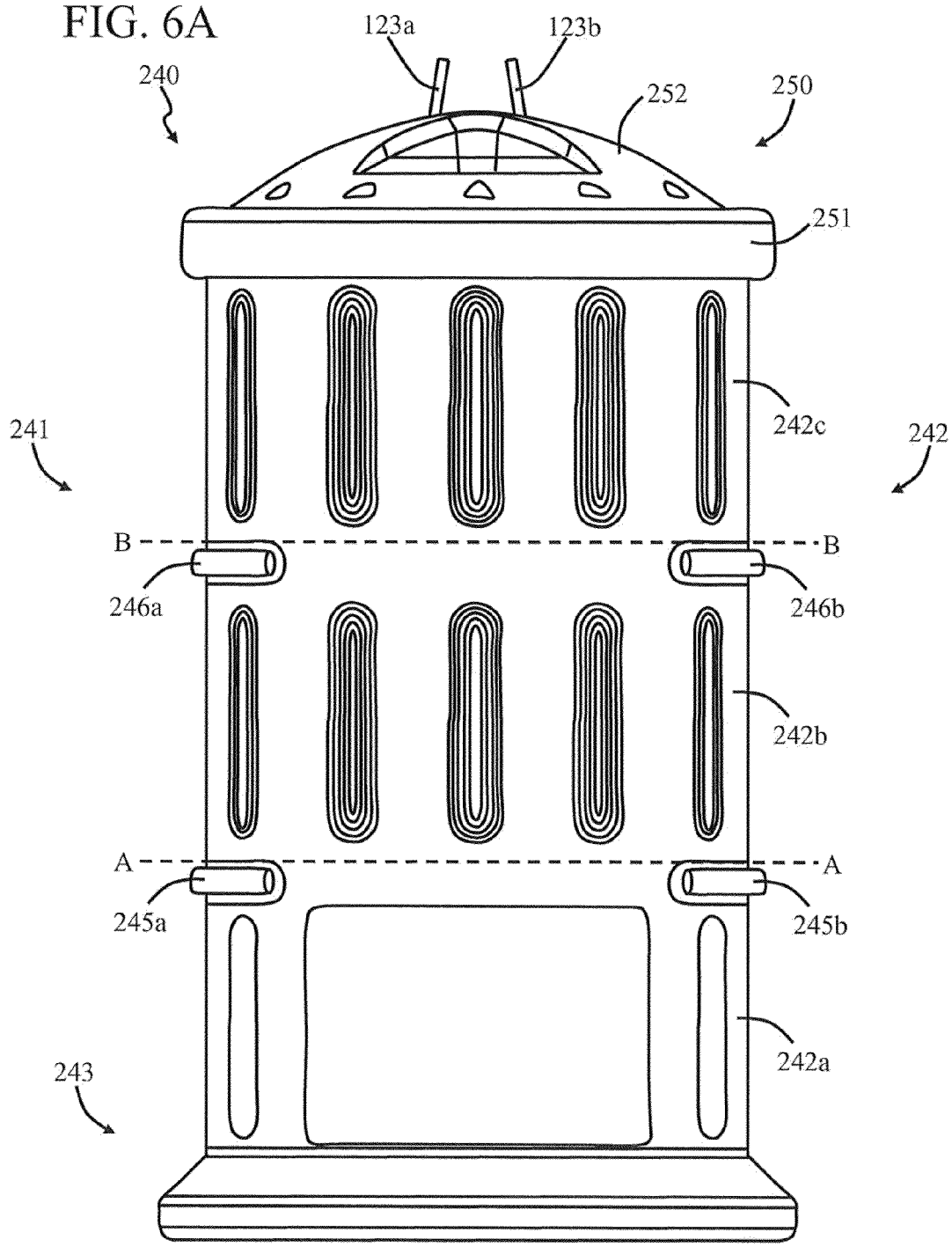

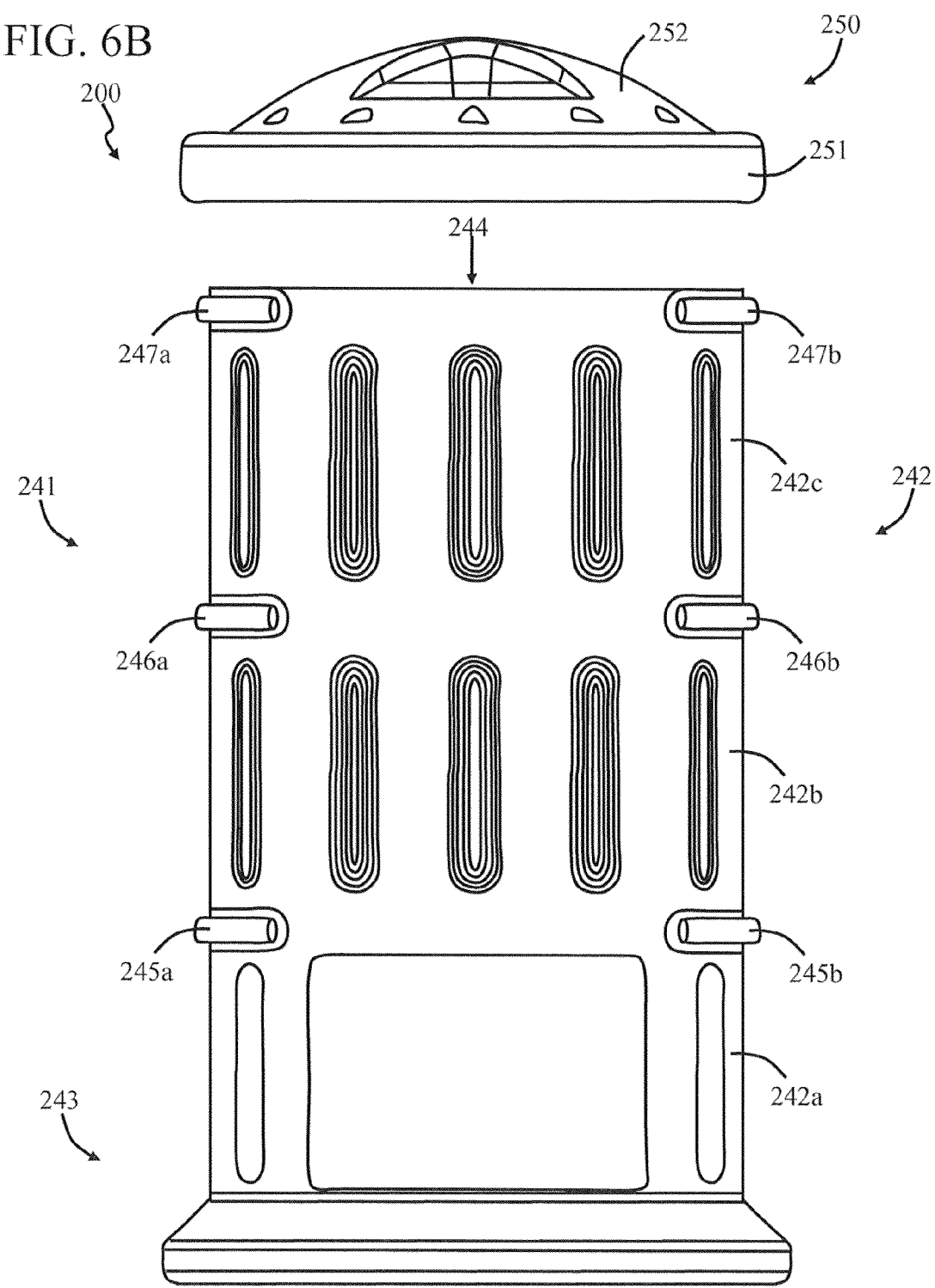

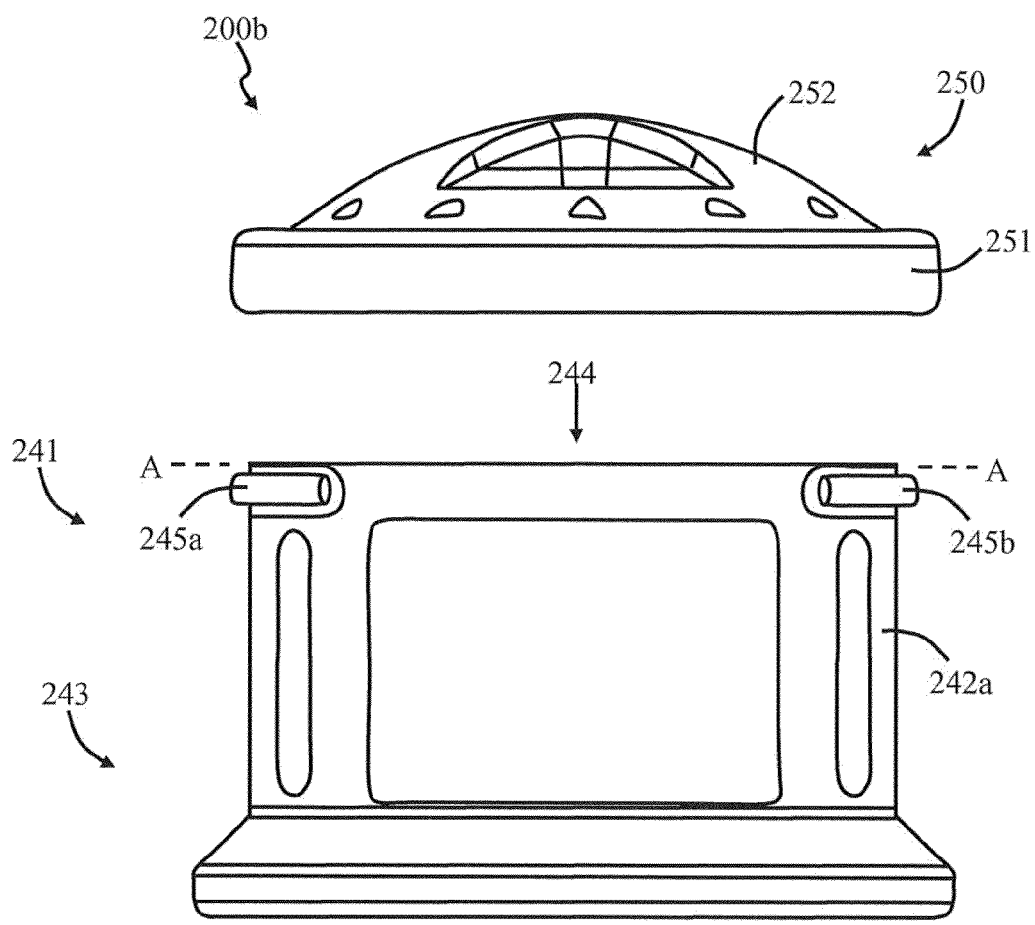

WATER MANAGEMENT SYSTEM

CROSS-REFERENCE TO RELATED APPLICATIONS

This application is a continuation-in-part of the earlier U.S. Utility Patent Application entitled "WATER CLEANING SYSTEM," Ser. No. 13/087,266, filed Apr. 14, 2011, now pending, which claims priority to U.S. Provisional Application No. 61/324,643, filed on Apr. 15, 2010, the contents of which are incorporated by reference as though fully set forth herein.

BACKGROUND OF THE INVENTION

1. Field of the Invention

This invention relates generally to a system for treating a liquid by using a gas.

2. Description of the Related Art

There are many different ways to treat a liquid, such as pool water, and most involve the use of a chemical. For example, most pools include chlorine in the water, wherein the chlorine reduces the amount of algae and bacteria. However, these chemicals affect the taste and odor of the water, which makes it uncomfortable to swim. Some pools include saltwater because algae and bacteria find it difficult to survive in saltwater. However, it is expensive to maintain a saltwater pool. More information regarding water cleaning systems and methods of cleaning water can be found in U.S. Pat. Nos. 3,926,802, 3,948,632, 4,098,602, 4,282,104, 5,332,511, 5,373,025, 5,541,150, 6,387,415 and 6,824,794, the contents of all of which are incorporated by reference as though fully set forth herein. While these reference may disclose systems suitable for their intended purposes, an improved water cleaning system is desirable.

BRIEF SUMMARY OF THE INVENTION

The present invention is directed to a liquid managing system for treating a liquid. The novel features of the invention are set forth with particularity in the appended claims. The invention will be best understood from the following description when read in conjunction with the accompanying drawings.

BRIEF DESCRIPTION OF THE DRAWINGS

FIG. 3F is a perspective view of one embodiment of and electrode housing of the electrode assembly of FIG. 3A.

FIG. 5D is a perspective view of one embodiment of the pool of the system of FIG. 5A.

FIGS. 5E and 5F are diagrams of different embodiments of systems which include the gas generating system of FIG. 1B in fluid communication with a pool.

FIGS. 6A and 6B are side views of another embodiment of a gas generating system, which can be used with the liquid cleaning system of FIG. 1B.

FIGS. 6E and 6F are side views of the gas generating system of FIGS. 6A and 6B having different sized vessels.

DETAILED DESCRIPTION OF THE INVENTION

Figure 1A:
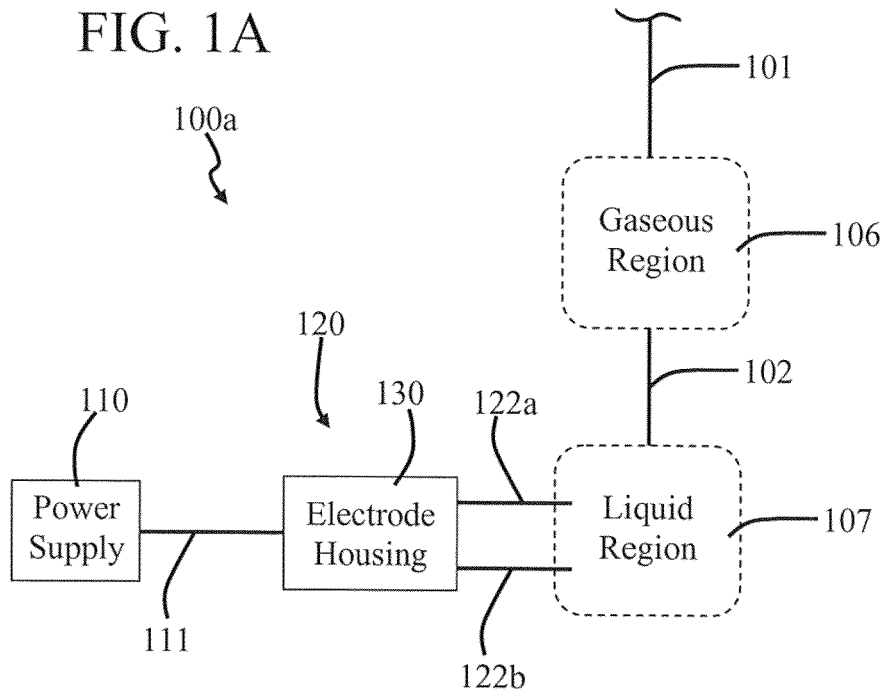
FIGS. 1A and 1B are diagrams of different embodiments of a liquid cleaning system.

The present invention involves a liquid cleaning system which cleans a liquid by removing contaminants therefrom. In some situations, the contaminants include algae and bacteria. The liquid cleaning system cleans the liquid by introducing a reactant gas into the liquid. The introduction of a gas into a liquid is sometimes referred to as sparging. The liquid cleaning system of the present invention sparges a reactant gas into the liquid. The reactant species of the reactant gas is chosen to treat the contaminants of the liquid to reduce their effectiveness. In this way, the liquid is cleaned. It should be noted that in the following figures, like reference characters indicate corresponding elements throughout the several views.

Figure 1B:
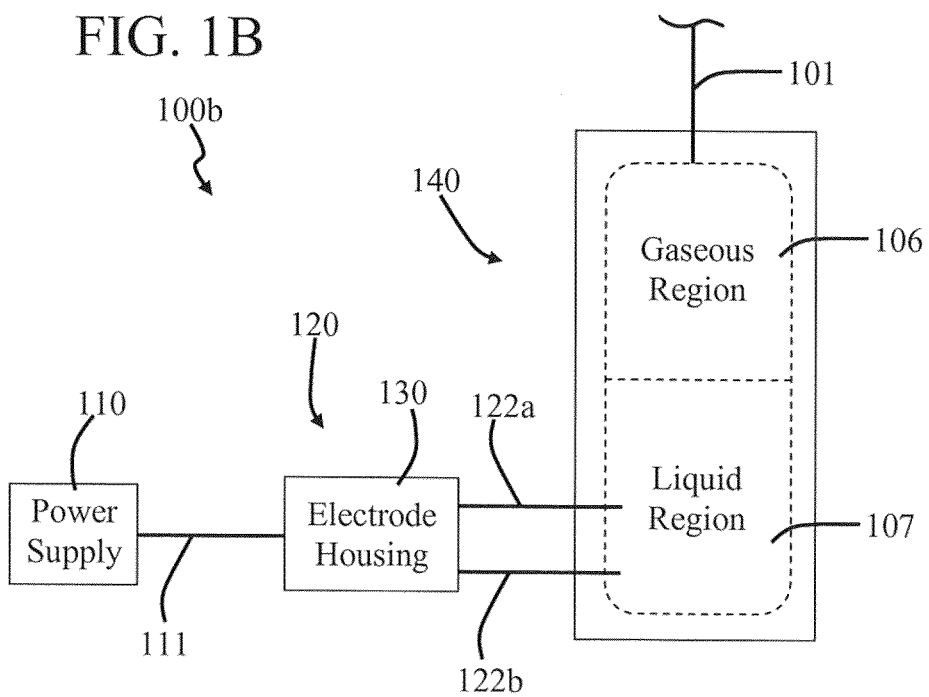

FIGS. 1A and 1B are diagrams of different embodiments of a liquid cleaning system, denoted as liquid cleaning systems 100a and 100b, respectively. In this embodiment, liquid cleaning system 100a includes a power supply 110 in communication with an electrode assembly 120 through a power cord 111. Power supply 110 can be of many different types. In some embodiments, power supply 110 is an AC power supply and, in other embodiments, power supply is a DC power supply. An AC power supply provides a power signal with an amplitude that varies with time in a periodic manner. A DC power supply provides a power signal with an amplitude that is substantially constant with time. In some embodiments, the DC power supply provides a power signal with an amplitude which does not vary with time in a periodic manner. In this way, the DC power supply provides a non-periodic power signal. A DC power supply is useful because it is less expensive and less complicated than an AC power supply.

The amplitude of the power signal can have many different values. In some embodiments, the amplitude of the power supply is between 90 volts and 130 volts. In some embodiments, the amplitude of the power signal is between 200 volts and 240 volts. In some embodiments, the amplitude of the power supply is between 90 volts and 130 volts AC (VAC). In some embodiments, the amplitude of the power signal is between 200 volts and 240 volts AC (VAC). In some embodiments, the amplitude of the power supply is between 90 volts and 130 volts DC (VDC). In some embodiments, the amplitude of the power signal is between 200 volts and 240 volts DC (VDC).

Electrode assembly 120 includes an electrode housing assembly 130 and electrodes 122a and 122b, wherein electrodes 122a and 122b are in communication with a liquid region 107 of liquid cleaning system 100a. Electrodes 122a and 122b are in communication with liquid region 107 because they can establish an electric field therethrough. The electric field is established in response to establishing a potential difference between electrodes 122a and 122b, as will be discussed in more detail below. It should be noted that embodiments of electrodes 122a and 122b are provided below with FIGS. 3a-3f and FIGS. 4a-4f.

Liquid region 107 includes a reactant liquid which is used to generate a reactant gas in response to the electric field being established through liquid region 107. In particular, the reactant liquid is used to generate the reactant gas in response to the potential difference being established between electrodes 122a and 122b. It should be noted that the reactant gas includes reactant ions which are provided in response to the electric field being established through the reactant liquid. In particular, the reactant gas includes reactant ions which are provided in response to the potential difference being established between electrodes 122a and 122b. The reactant ion adjusts the pH of the reactant liquid, wherein the pH is a measure of the acidity or basicity of an aqueous solution. The reactant ion ionizes matter included with the liquid. The matter can be of many different types, such as algae and bacteria.

The reactant liquid can be of many different types. In some embodiments, the reactant liquid includes an acid. The acid of the reactant liquid can be of many different types, such as organic and inorganic acids. One type of inorganic acid that can be used is hydrochloric acid (muriatic acid). The hydrochloric acid is typically an aqueous solution. The concentration of the hydrochloric acid of the aqueous solution can be in many different ranges. In some embodiments, the concentration of the hydrochloric acid is six percent (6%) to thirty six percent (36%). In some embodiments, the concentration of the hydrochloric acid is five percent (5%) to forty percent (40%). In some embodiments, the concentration of the hydrochloric acid is less than fifty percent (50%). In one particular, embodiment, the concentration of the hydrochloric acid is twenty-seven percent (27%) to thirty-three (33%).

In some embodiments, the reactant ion has a positive charge and, in other embodiments, the reactive ion has a negative charge. In some embodiments, the additive includes a metal. The metal can be of many different types, such as nickel, brass, titanium, steel, silver, graphite, bronze and/or gold. In some embodiments, the metal includes copper and/or a copper alloy. The amount of copper included can be in many different ranges. In some embodiments, the amount of copper used is 0.05 pounds per gallon of acid to 0.29 pounds of per gallon of acid. The copper and copper alloy form a positive reactant ion. In general, the amount of copper used is chosen to provide a desired pH to the reactant liquid.

Figure 1C:
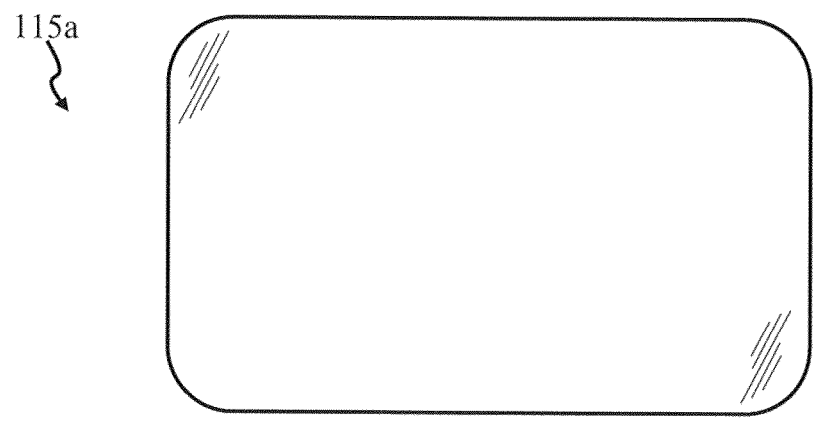
FIGS. 1C and 1D are top plan and perspective views, respectively, of a solid piece which includes an additive, wherein the solid piece is used with the liquid cleaning system of FIGS. 1A and 1B.
Figure 1D:
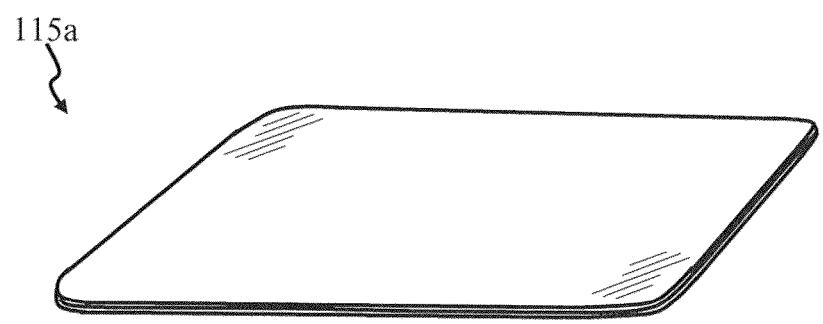

The reactant liquid includes an additive which determines the type of reactant ion. In some embodiments, the additive is a liquid and, in other embodiments, the additive is a solid in the form of a solid piece of material. For example, as shown in FIGS. 1C and 1D, the additive is in the form of a solid piece of material embodied as solid piece 115a, wherein solid piece 115a is added to the acid of the reactant liquid. Solid piece 115a dissolves in response to being added to the acid of the reactant liquid. It is useful for the additive to be a solid piece of material because it is easier, safer and less expensive to transport from one location to another, such as through the mail.

Figure 1E:
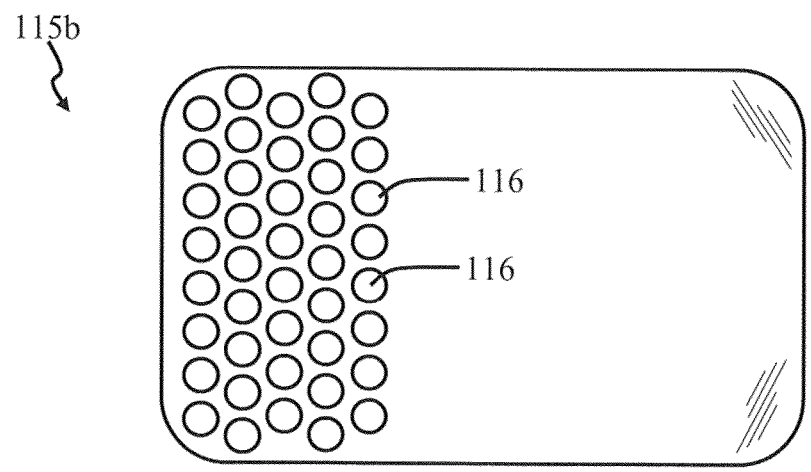
FIG. 1E is a top plan view of another embodiment of a solid piece which includes an additive, wherein the solid piece includes an opening.

Further, it is useful for the additive to be a solid piece of material because its size can be adjusted to adjust the amount of additive of the solid piece. In this way, the mount of additive added to the reactant liquid is adjustable. For example, FIG. 1E is a top plan view of a solid piece 115b which includes the additive. In this embodiment, solid piece 115b includes a plurality of openings 116, whose number and size is chosen so that a desired amount of additive is included with solid piece 115b. The amount of additive of solid piece 115b increases and decreases as the number of openings decreases and increases, respectively. Further, the amount of additive of solid piece 115b increases and decreases as the size of the openings decreases and increases, respectively. In this way, the amount of additive of solid piece 115b can be adjusted to so that solid piece 115b includes a desired amount of additive. It should be noted that, in general, solid piece 115b includes one or more openings. However, a plurality of openings are shown in FIG. 1E is illustrative purposes.

It is useful to be able to adjust the amount of additive of solid piece 115b because the amount of additive chosen depends on the size of the body of liquid it is desired to treat. In general, more and less additive is desired as the size of the body of fluid increases and decreases, respectively. Further, it is useful to be able to adjust the amount of additive of solid piece 115b because the amount of additive chosen depends on the time it is desired to treat the body of liquid. In general, more and less additive is desired as the amount of desired time increases and decreases, respectively. It is useful to be able to adjust the amount of additive of solid piece 115b because the amount of additive chosen depends on the size of liquid region 107. In general, more and less additive is desired as the size of liquid region 107 increases and decreases, respectively. Liquid regions of different sizes are discussed below with FIGS. 6A, 6E and 6F.

In this embodiment, liquid cleaning system 100a includes a gaseous region 106 in fluid communication with liquid region 107 through a conduit 102. Gaseous region 106 includes the reactant gas, which is formed from the reactant liquid of liquid region 107. In particular, gaseous region 106 includes the reactant gas, which is formed in response to the electric field being established through liquid region 107.

Further, gaseous region 106 includes the reactant gas, which is formed in response to the potential difference being established between electrodes 122a and 122b. As mentioned above, the reactant gas includes reactant ions provided by the reactant liquid of liquid region 107, wherein the reactant ions are provided in response to the electric field being established. It should be noted that a conduit allows a fluid to flow therethrough. The conduit can be of many different types, such as a pipe and hose.

In this embodiment, liquid cleaning systems 100a includes a conduit 101 in fluid communication with gaseous region 106. Conduit 101 is in fluid communication with conduit 102 through gaseous region 101, and conduit 101 is in fluid communication with a body of liquid (not shown), such as a body of water. The reactant gas formed from the reactant liquid of liquid region 107 flows upwardly through conduit 102, gaseous region 106 and conduit 101, and to the body of liquid.

Figure 5A:
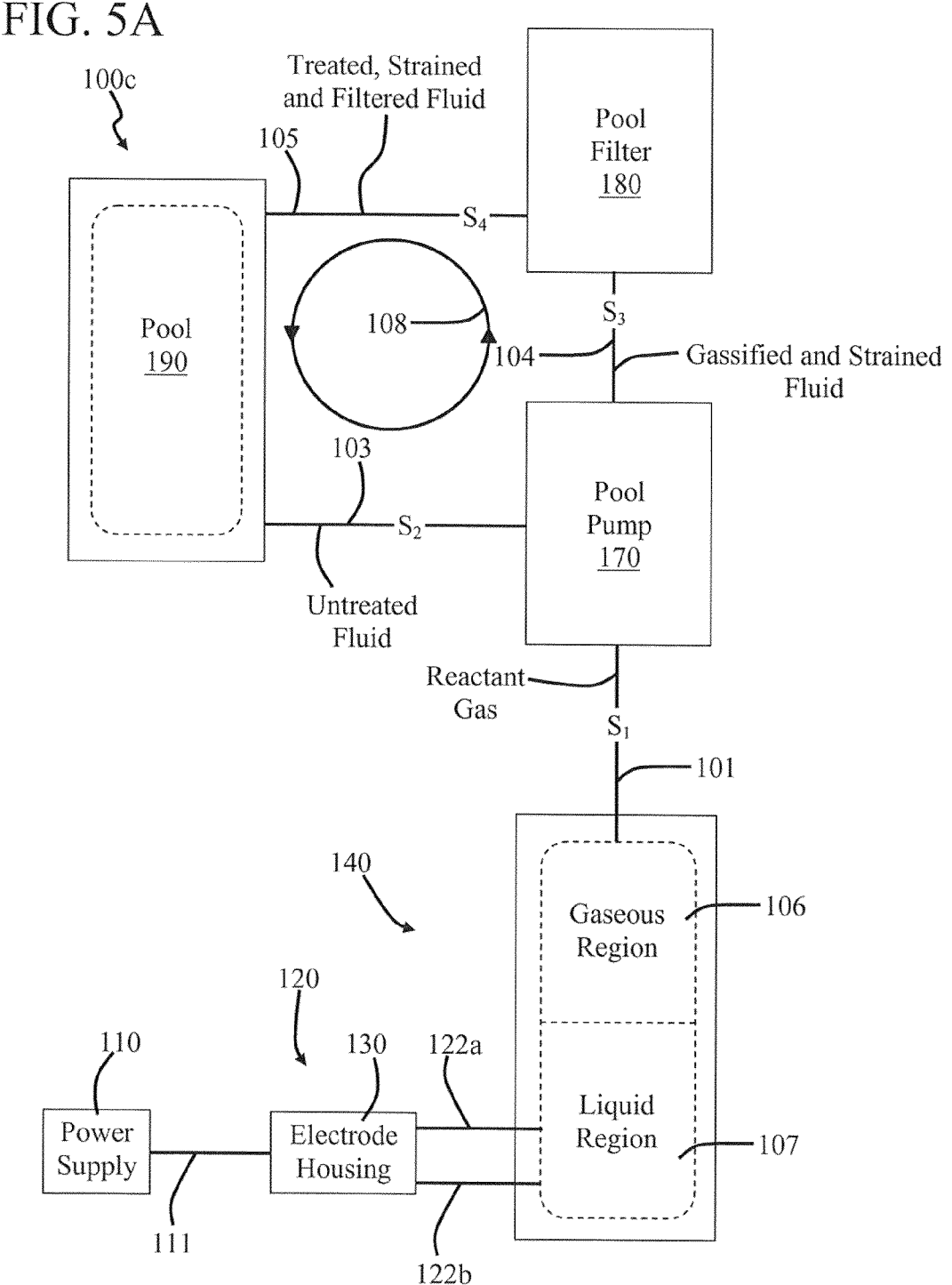
FIG. 5A is a diagram of a system which includes the gas generating system of FIG. 1B in fluid communication with a pool.

The body of liquid can be of many different types. In the embodiment of FIG. 5A, the body of liquid is the water of a swimming pool, and conduit 101 is in fluid communication with the water of the swimming pool through a pool pump and pool filter, as will be discussed in more detail below.

The reactant gas is chosen so that it treats the body of liquid. The reactant gas can treat the body of liquid in many different ways. In some situations, the pH of the body of liquid is adjusted in response to the flow of the reactant gas. In some situations, the amount of bacteria of the body of liquid is reduced in response to the flow of the reactant gas. In some situations, the amount of algae of the body of liquid is reduced in response to the flow of the reactant gas. In this way, system 100a operates as a liquid treatment system.

In operation, power supply 110 provides a power signal to electrode assembly 120 through power cord 111, and electrode assembly 120 establishes the electric field through liquid region 107. In particular, electrode assembly 120 establishes the electric field through liquid region 107 in response to establishing the potential difference between electrodes 122a and 122b.

As mentioned above, the reactant gas is provided to gaseous region 106 through conduit 102 in response to electric field being established through liquid region 107. In particular, the reactant gas is provided to gaseous region 106 through conduit 102 in response to the potential difference being established between electrodes 122a and 122b. The reactant gas flows through conduit 101 and into the body of liquid (not shown).

In the embodiments in which the body of liquid is water, the reactant ions of the reactant gas treat the body of water. The reactant ions can treat the body of water in many different ways. In some situations, the pH of the body of water is adjusted in response to the flow of the reactant ions. In some situations, the amount of bacteria of the body of water is reduced in response to the flow of the reactant ions. In some situations, the amount of algae of the body of water is reduced in response to the flow of the reactant ions. The ionization of the bacteria and algae reduces the likelihood that the bacteria and algae will survive in the body of water. Further, the ionization of the bacteria and algae reduces the likelihood that the bacteria and algae will reproduce in the body of water. In this way, system 100a operates as a water treatment system.

In the embodiments in which the body of liquid is water and the additive includes copper, the reactant copper ions of the reactant gas treat the body of water. The reactant copper ions can treat the body of water in many different ways. In some situations, the pH of the body of water is adjusted in response to the flow of the reactant copper ions. In some situations, the amount of bacteria of the body of water is reduced in response to the flow of the reactant copper ions. In some situations, the amount of algae of the body of water is reduced in response to the flow of the reactant copper ions. The ionization of the bacteria and algae reduces the likelihood that the bacteria and algae will survive in the body of water. Further, the copper ionization of the bacteria and algae reduces the likelihood that the bacteria and algae will reproduce in the body of water. In this way, system 100a operates as a water treatment system. It should be further understood that other metals may be used as the additive in a water treatment system and accordingly, while copper is discussed, other metals may be substituted with similar results and operation.

In FIG. 1b, liquid cleaning system 100b includes power supply 110 in communication with electrode assembly 120 through power cord 111. Electrode assembly 120 includes electrode housing assembly 130 and electrodes 122a and 122b. In this embodiment, liquid cleaning system 100b includes a gas generating system 140, which includes gaseous region 106 and liquid region 107 in fluid communication with each other. One embodiment of gas generating system 140 is discussed in more detail below with FIGS. 2a-2d. Electrodes 122a and 122b are in communication with gas generating system 140. In particular, electrodes 122a and 122b are in communication with liquid region 107, as discussed in more detail above with FIG. 1a.

In this embodiment, liquid cleaning systems 100b includes conduit 101 in fluid communication with gas generating system 140. In particular, conduit 101 is in fluid communication with gaseous region 106 and the body of water, as discussed in more detail above with FIG. 1A.

Figure 2A:
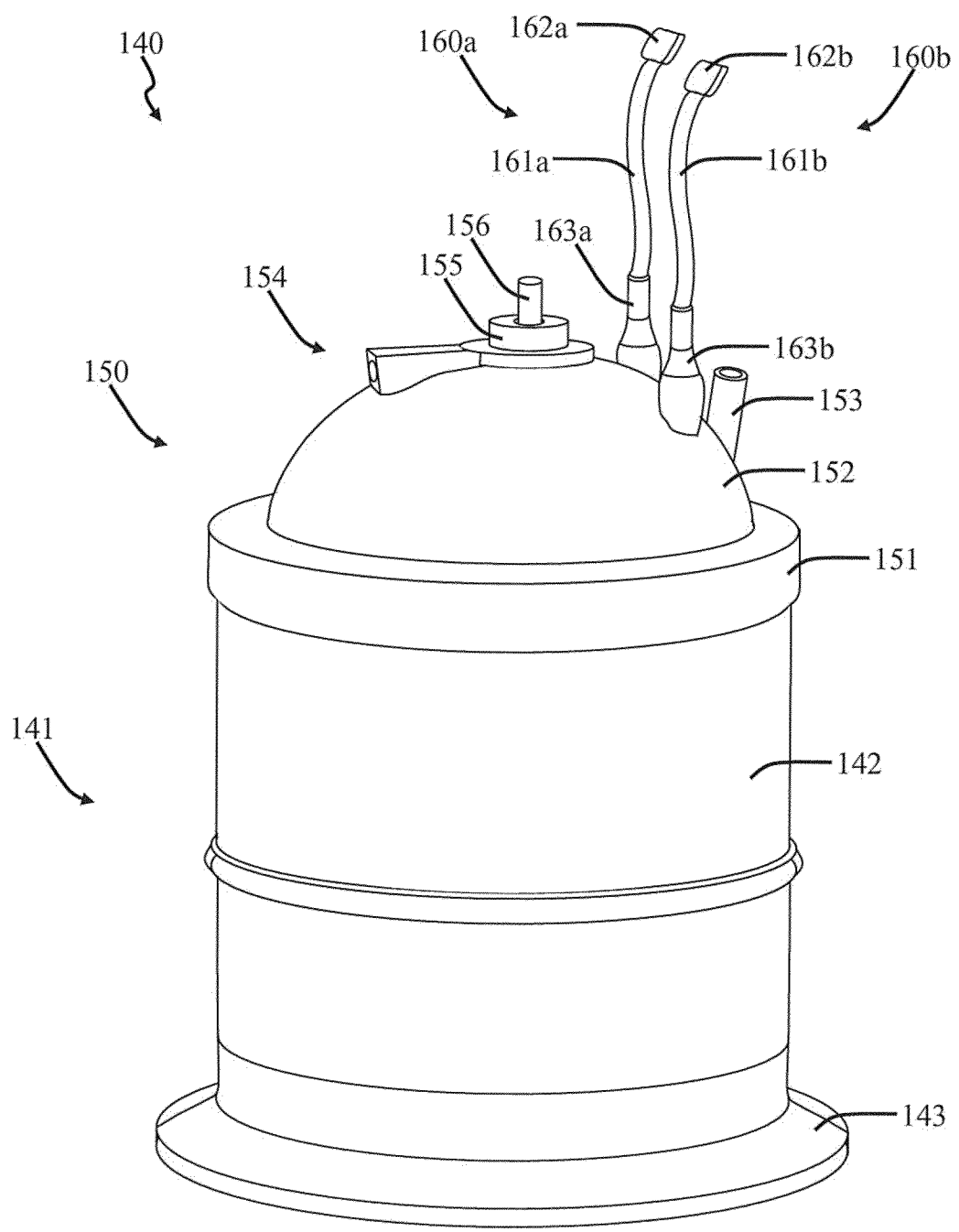
FIGS. 2A and 2B are perspective views of one embodiment of a gas generating system of the liquid cleaning system of FIG. 1B.
Figure 2B:
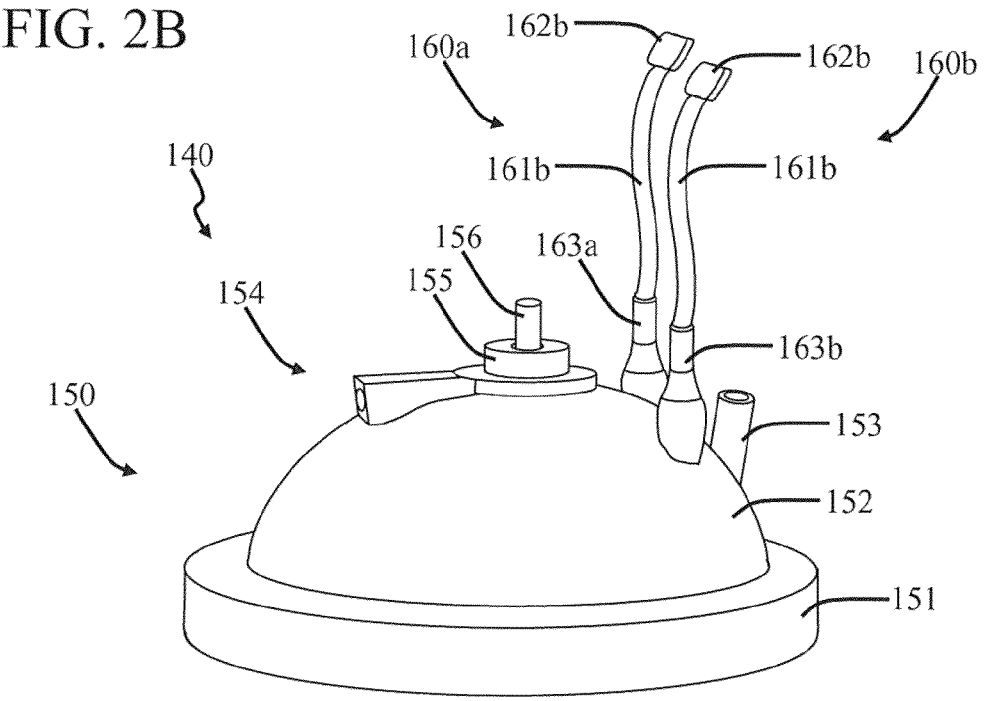
Figure 2B:
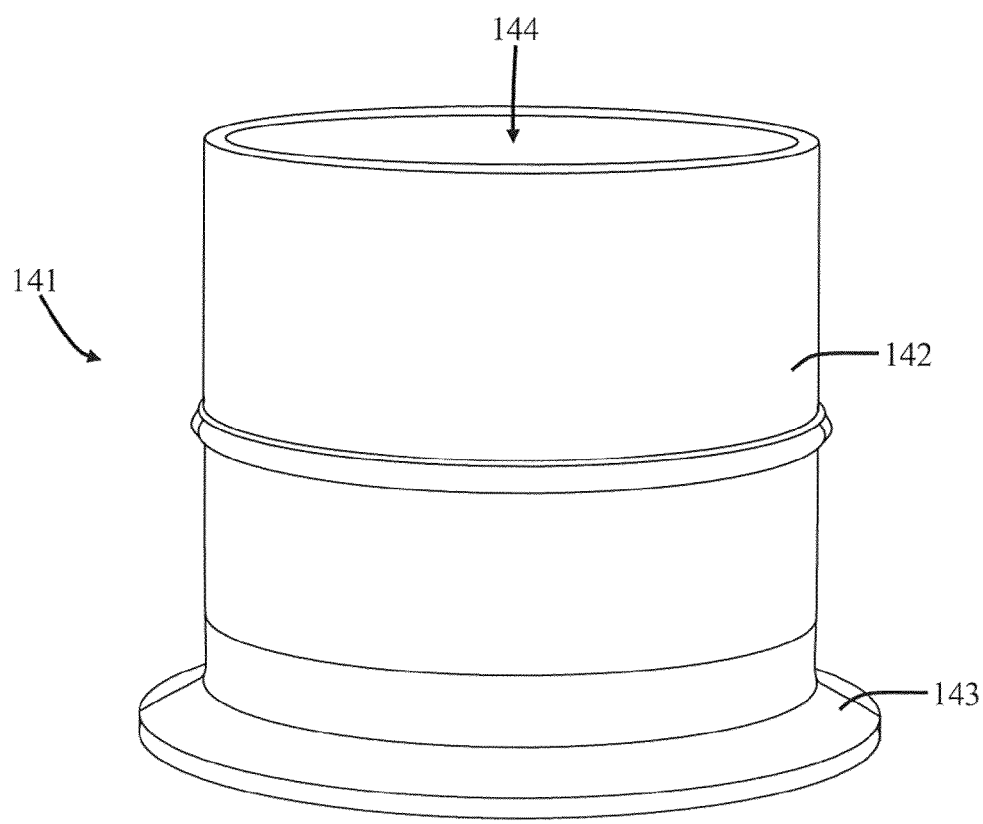
Figure 2C:
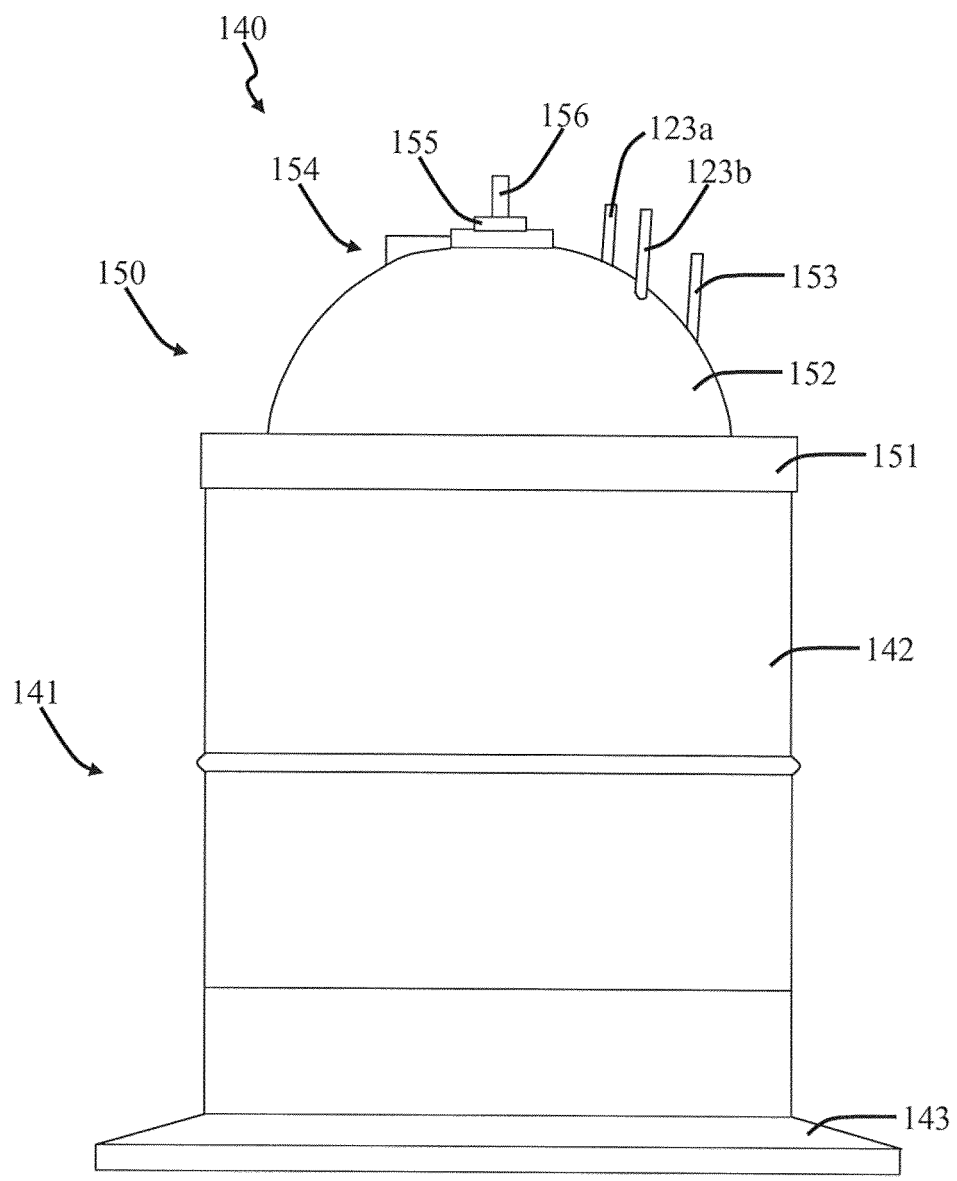
FIGS. 2C and 2D are side and side cut-away views, respectively, of the gas generating system of FIG. 1B.
Figure 2D:
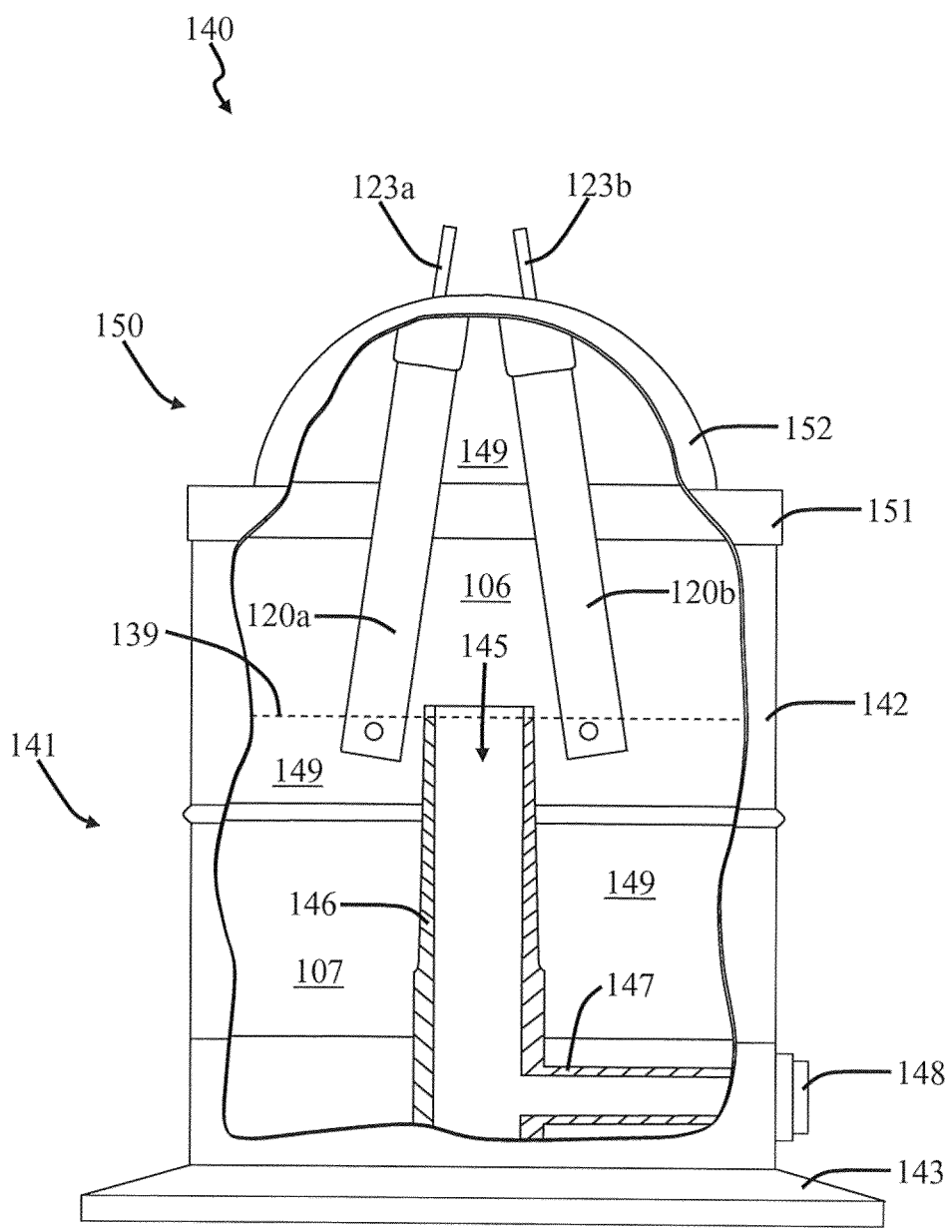

FIGS. 2A and 2B are perspective views of one embodiment of gas generating system 140, and FIGS. 2C and 2D are side and side cut-away views, respectively, of gas generating system 140. In this embodiment, gas generating system 140 includes a vessel lid 150 carried by a vessel 141. Vessel 141 and vessel lid 150 can include many different materials. Vessel 141 and vessel lid 150 include a material that is resistant to the chemicals of the reactant liquid and reactant gas. There are many different types of materials that are resistant to the chemicals of the reactant liquid and reactant gas, such as a plastic. There are many different types of plastics available, such as polypropylene and polyvinyl chloride.

Vessel 141 can be of many different types. In this embodiment, vessel 141 includes a vessel body 142, which includes a vessel base 143 at one end and a vessel body opening 144 (FIG. 2B) at an opposed end. Vessel base 143 supports vessel body 142 in an upright position so that vessel body opening 144 faces upwardly. It should be noted that, in some embodiments, vessel base 143 and vessel body 142 are repeatably moveable between coupled and uncoupled conditions. Vessel base 143 and vessel body 142 are shown in the coupled condition in FIGS. 2A, 2B, 2C and 2D. In other embodiments. vessel base 143 and vessel body 142 are a single integral piece.

In this embodiment, vessel lid 150 includes a vessel lid base 151 and vessel lid dome 152. Vessel lid 150 is repeatably moveable between positions engaged with and disengaged from vessel body 142, wherein vessel lid 150 is engaged with vessel body 142 in FIGS. 2A, 2C and 2D, and vessel lid 150 is disengaged from vessel body 142 in FIG. 2B. It should be noted that vessel lid 150 covers vessel body opening 144 when it is engaged with vessel body 142. Further, as shown in FIG. 2D, gas generating system 140 includes a vessel chamber 149, which is enclosed by vessel 141 and vessel lid 150. Vessel chamber 149 will be discussed in more detail below.

In this embodiment, vessel lid 150 is fastened to vessel body 142 with a fastener 155 and rod 156. In this embodiment, rod 156 is a threaded rod, which extends through vessel lid 150 and vessel body 142, and fastener 155 is a threaded nut which is threadingly engaged with rod 156 to fasten vessel lid 150 to vessel body 142. It should be noted that the seal formed between vessel lid 150 and vessel body 142 becomes stronger and weaker in response to tightening and untightening, respectively, fastener 155 with rod 156. It should also be noted that rod 156 can be coupled to vessel body 142 in many different ways. In some embodiments, vessel rod 156 is coupled to vessel base 143, and extends upwardly therefrom through vessel body opening 144.

In this embodiment, vessel lid 150 includes a gas output port 153 which extends through vessel dome 152. Gas output port 153 is in fluid communication with vessel chamber 149 through vessel dome 152, and receives conduit 101 (FIGS. 1A and 1B).

In this embodiment, vessel lid 150 includes a gas vent 154 which allows the pressure of a gas in vessel chamber 149, such as the reactant gas, to vent therethrough. Hence, gas vent 154 reduces the likelihood that the pressure of the gas in vessel chamber 149 will be too high.

As shown in FIG. 2D, vessel 141 includes drain conduits in fluid communication with each other, wherein drain conduit 146 extends upwardly and drain conduit 147 extends radially. In this embodiment, drain conduit 146 includes an upwardly facing drain opening 145 which faces vessel body opening 144. It should be noted that drain opening 145 faces vessel lid 150 when it is engaged with vessel body 142.

As mentioned above, rod 156 can be coupled to vessel body 142 in many different ways. In some embodiments, rod 156 is coupled to drain conduit 146 (not shown). In some embodiments, rod 156 extends through drain opening 145 and is coupled to drain conduit 146 (not shown).

In this embodiment, drain conduit 147 extends through vessel body 142 and is in fluid communication with a drain outlet 148. It should be noted that drain conduit 146 extents through liquid region 107 (FIG. 1B), and drain opening 145 is in fluid communication with gaseous region 106.

In this embodiment, gas generating system 140 includes electrode assemblies 120a and 120b, as shown in FIGS. 2C and 2D, and electrode cords 160a and 160b, as shown in FIGS. 2A and 2B, which are coupled to electrode assemblies 120a and 120b, respectively. In particular, electrode cords 160a and 160b are coupled to electrodes terminals 123a and 123b of electrode assemblies 120a and 120b, respectively. Electrode assemblies 120a and 120b will be discussed in more detail below with FIGS. 3A-3E and FIGS. 4A-4E. Further, as will be discussed in more detail below, electrodes terminals 123a and 123b are included with electrodes 122a and 122b, respectively, of FIGS. 1A and 1B.

In this embodiment, electrode cords 160a and 160b include power cords 161a and 161b, respectively. Power cords 161a and 161b are in communication with electrodes 123a and 123b, respectively, through electrode connectors 163a and 163b, respectively.

In this embodiment, electrode cords 160a and 160b includes power cord connectors 162a and 162b, respectively. Power cord connectors 162a and 162b are in communication with electrode connectors 163a and 163b, respectively, through power cords 161a and 161b, respectively. Further, power cord connectors 162a and 162b are in communication with electrodes 123a and 123b, respectively, through corresponding electrode connectors 163a and 163b and power cords 161a and 161b.

It should be noted that electrode cords 160a and 160b are in communication with a power supply, such as power supply 110 of FIGS. 1A and 1B. In particular, power cord connectors 162a and 162b are coupled with power cord 111. In this way, the power supply provides power to electrode assemblies 120a and 120b through electrode cords 160a and 160b, respectively.

It should be noted that electrode assemblies 120a and 120b extend through gaseous region 106 and liquid region 107. In some embodiments, however, electrode assemblies 120a and 120b extend through liquid region 107 and do not extend through gaseous region 106. Further, it should be noted that distal ends of electrode assemblies 120a and 120b terminate proximate to liquid conduit 146. Distal ends of electrode assemblies 120a and 120b terminate proximate to drain opening 145. Distal ends of electrode assemblies 120a and 120b terminate in liquid region 107. Proximal ends of electrode assemblies 120a and 120b terminate proximate to vessel dome 152. Further, proximal ends of electrode assemblies 120a and 120b terminate in gaseous region 106.

As shown in FIG. 2D, gaseous region 106 and liquid region 107 are included with vessel chamber 149, wherein gaseous region 106 extends through a portion of vessel chamber 149 proximate to vessel lid, as well as through a portion of vessel chamber 149 which extends through an upper portion of vessel body 142. Liquid region 107 extends through a portion of vessel chamber 149 which extends through a lower portion of vessel body 142.

For reference purposes, a boundary 139 extends between the upper and lower portions of vessel body 142, wherein boundary 139 corresponds with an upper level of the reactant liquid of gaseous region 106 is above boundary 139 and liquid region 107 is below boundary region 107. It should be noted that boundary 139 extends through electrode assemblies 120a and 120b so that the distal ends of electrode assemblies 120a and 120b extend through liquid region 107. In particular, the distal ends of electrode assemblies 120a and 120b terminate in liquid region 107. It should also be noted that boundary 139 extends through drain conduit 146 so that drain opening 145 extends through gaseous region 106. In this way, the reactant liquid of liquid region 107 flows through drain opening 145 in response to being driven above boundary 139. Hence, the reactant liquid is restricted from flowing upwardly through gaseous region 106. In this way, the liquid reactant of liquid region 107 is restricted to the level of drain opening 145.

Figure 3A:
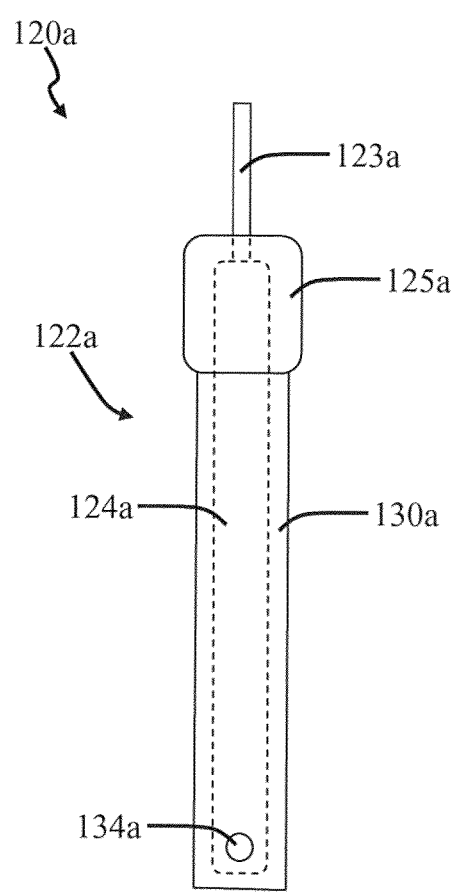
FIG. 3A is a side view of one embodiment of an electrode assembly of the gas generating system of FIG. 1B.

FIG. 3A is a side view of one embodiment of electrode assembly 120a. In this embodiment, electrode assembly 120a includes electrode 122a, which extends through an electrode housing 130a and electrode cap 125a. Electrode cap 125a is carried by electrode housing 130a, and electrode terminal 123a extends upwardly through electrode cap 125a. It should be noted that electrode housing 130a is included with electrode housing of FIGS. 1A and 1B, and electrode 122a and electrode terminal 123a are shown in FIGS. 1A and 1B.

Figure 3B:
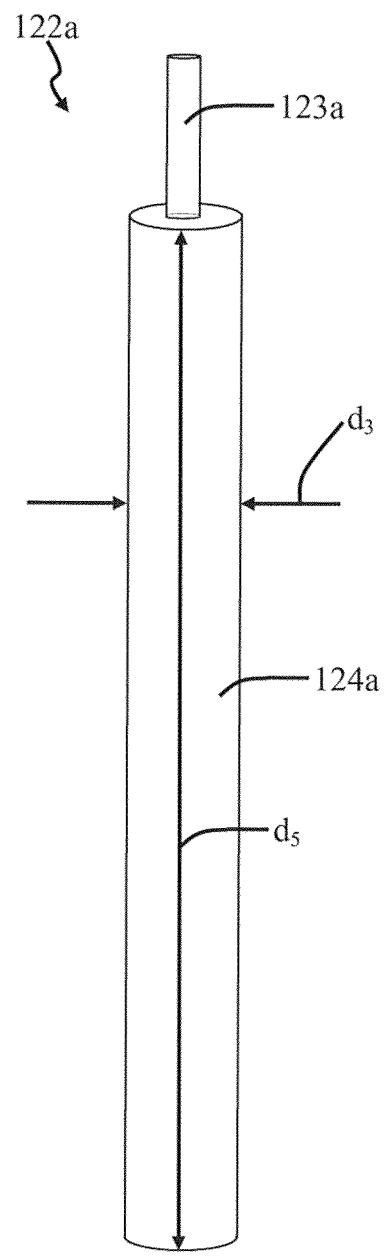
FIG. 3B is a perspective view of an electrode of the electrode assembly of FIG. 3A.

FIG. 3B is a perspective view of electrode 122a. In this embodiment, electrode 122a includes electrode terminal 123a coupled to an electrode body 124a, wherein electrode body 124b has a circular cross-sectional shape. As shown in FIG. 3A, electrode body 130a extends through electrode housing 130a and electrode cap 125a. In particular, electrode body 124a is housed by electrode housing 130a and electrode cap 125a. Electrode body 124a can include many different types of conductive materials. In some embodiments, electrode body 124a includes graphite and titanium. In some embodiments, electrode body 124a includes graphite and titanium. In some embodiments, electrode body 124a includes a material compressed into a graphite rod. For example, in some embodiments, electrode body 124a includes nickel, brass, titanium, copper, copper alloy, steel, silver, bronze and/or gold compressed into the graphite rode.

Electrode body 124a can have many different dimensions. In this embodiment, electrode body 124a has a longitudinal dimension $d_5$ and a radial dimension $d_3$. Dimensions $d_5$ and $d_3$ can have many different values. In some embodiments, dimension $d_5$ is one inch (1 inch) to seventy two inches (72 inches). In some embodiments, dimension d3 is one-half of an inch (0.5 inches) to two inches (2 inches). The values of dimensions $d_3$ and $d_5$ depend on the amount of reactant gas it is desired to provide.

Figure 3C:
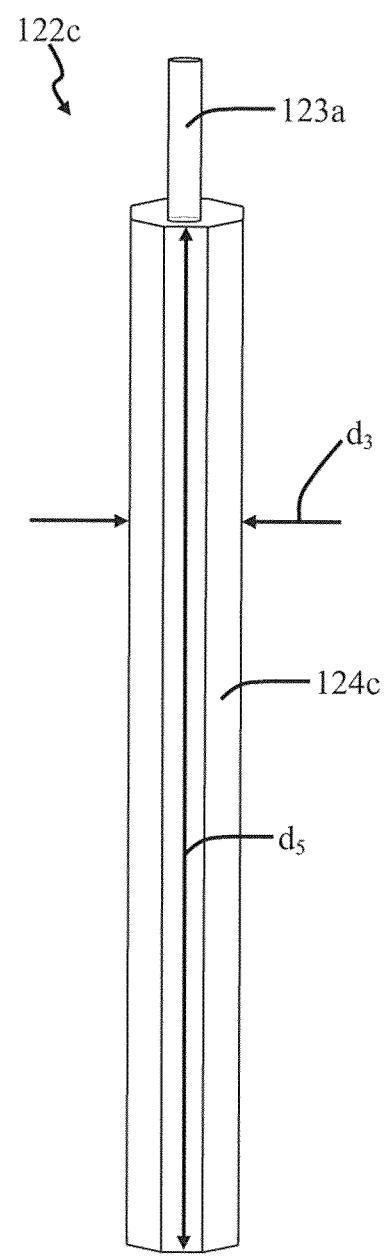
FIG. 3C is a perspective view of another embodiment of an electrode assembly of the electrode assembly of FIG. 3A.

FIG. 3C is a perspective view of another embodiment of an electrode, which is denoted as electrode 122c. In this embodiment, electrode 122c includes electrode terminal 123a coupled to an electrode body 124c, wherein electrode body 124c has a hexagonal cross-sectional shape. Electrode body 124c can include the same material as electrode body 124a.

Figure 3D:
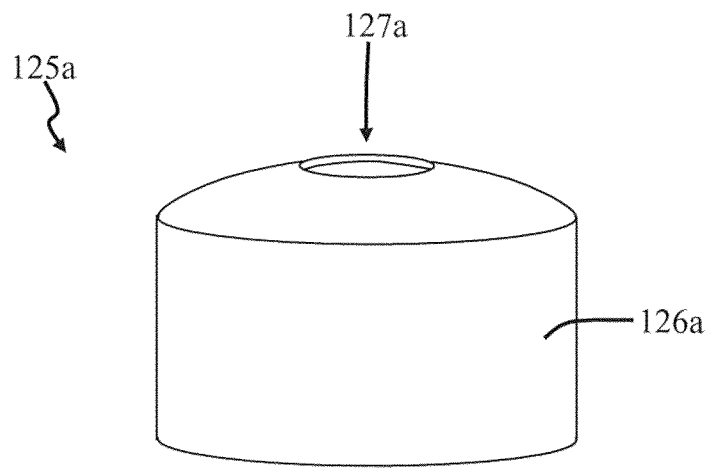
FIGS. 3D and 3E are top and bottom perspective views, respectively, of one embodiment of and electrode cap of the electrode assembly of FIG. 3A.
Figure 3E:
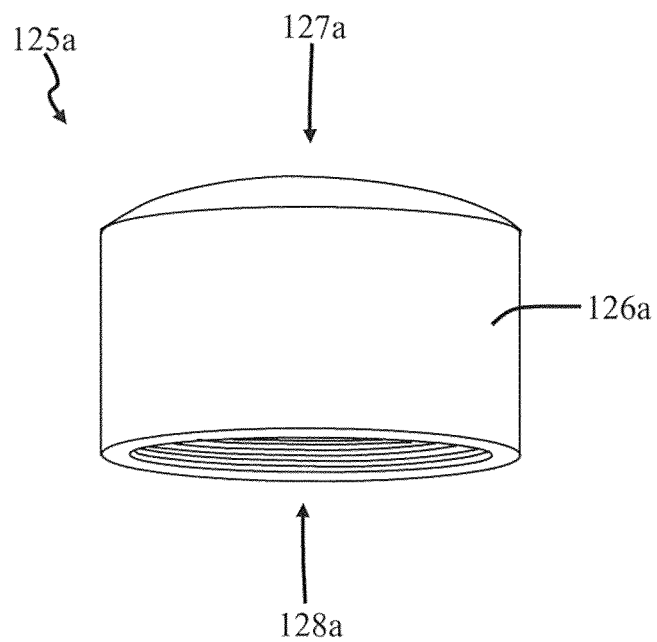
Figure 4A:
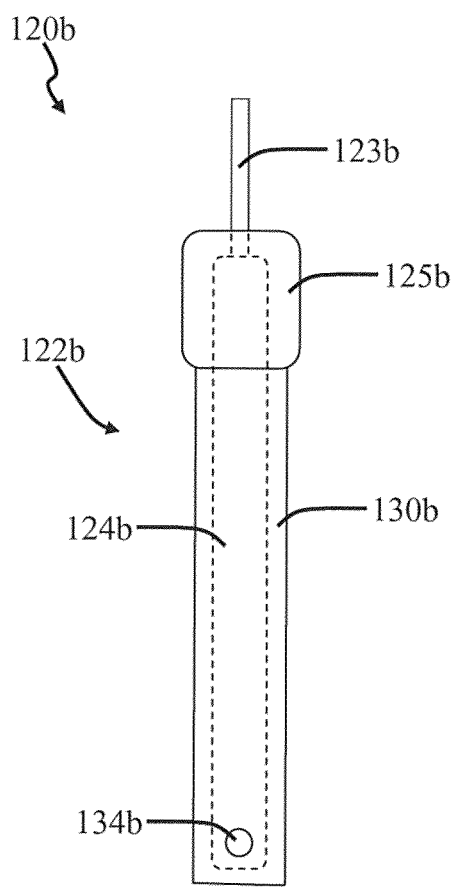
FIG. 4A is a side view of one embodiment of an electrode assembly of the gas generating system of FIG. 1B.
Figure 4B:
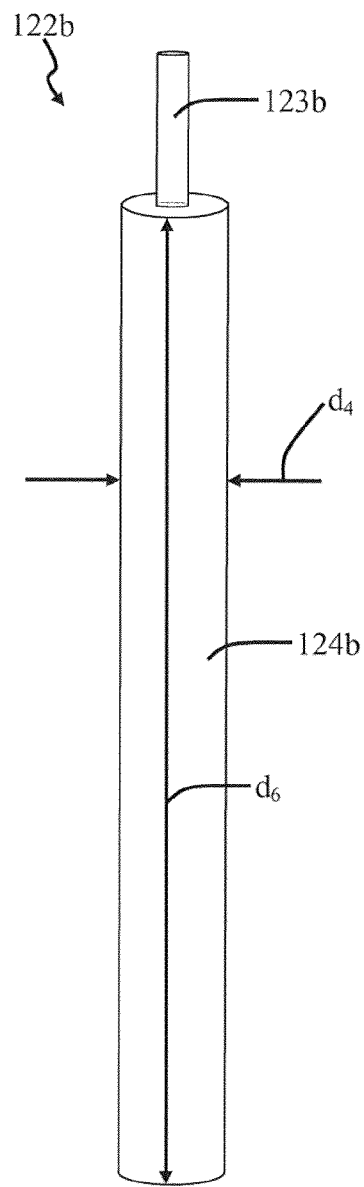
FIG. 4B is a perspective view of an electrode of the electrode assembly of FIG. 4A.
Figure 4C:
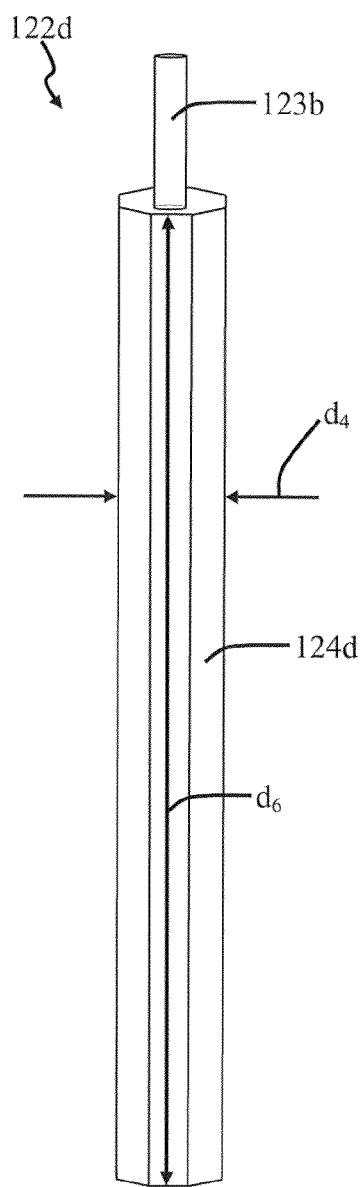
FIG. 4C is a perspective view of another embodiment of an electrode assembly of the electrode assembly of FIG. 4A.
Figure 4D:
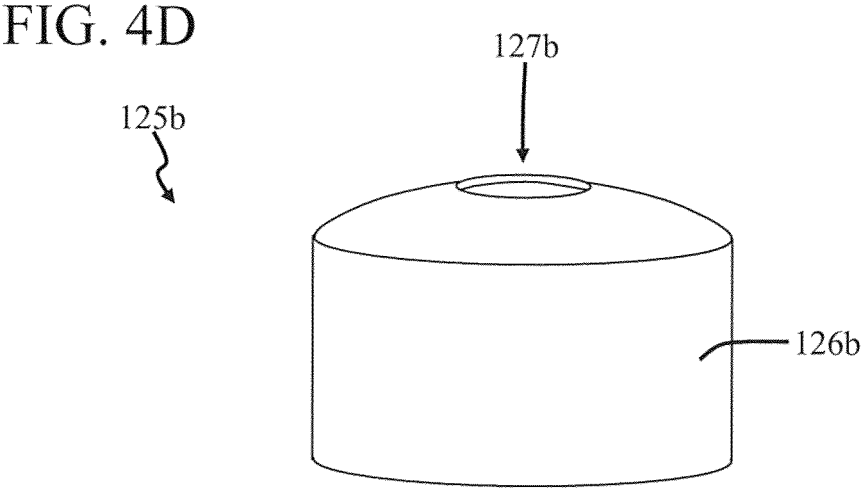
FIGS. 4D and 4E are top and bottom perspective views, respectively, of one embodiment of and electrode cap of the electrode assembly of FIG. 4A.
Figure 4E:
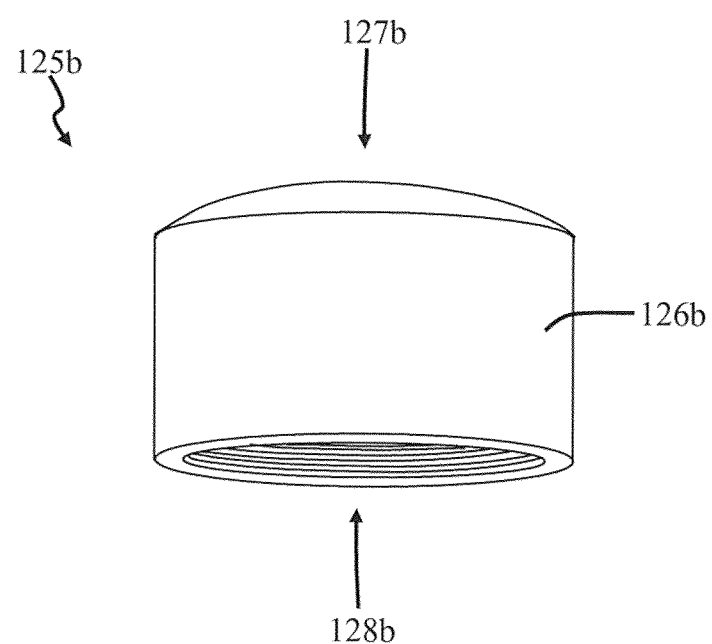
Figure 4F:
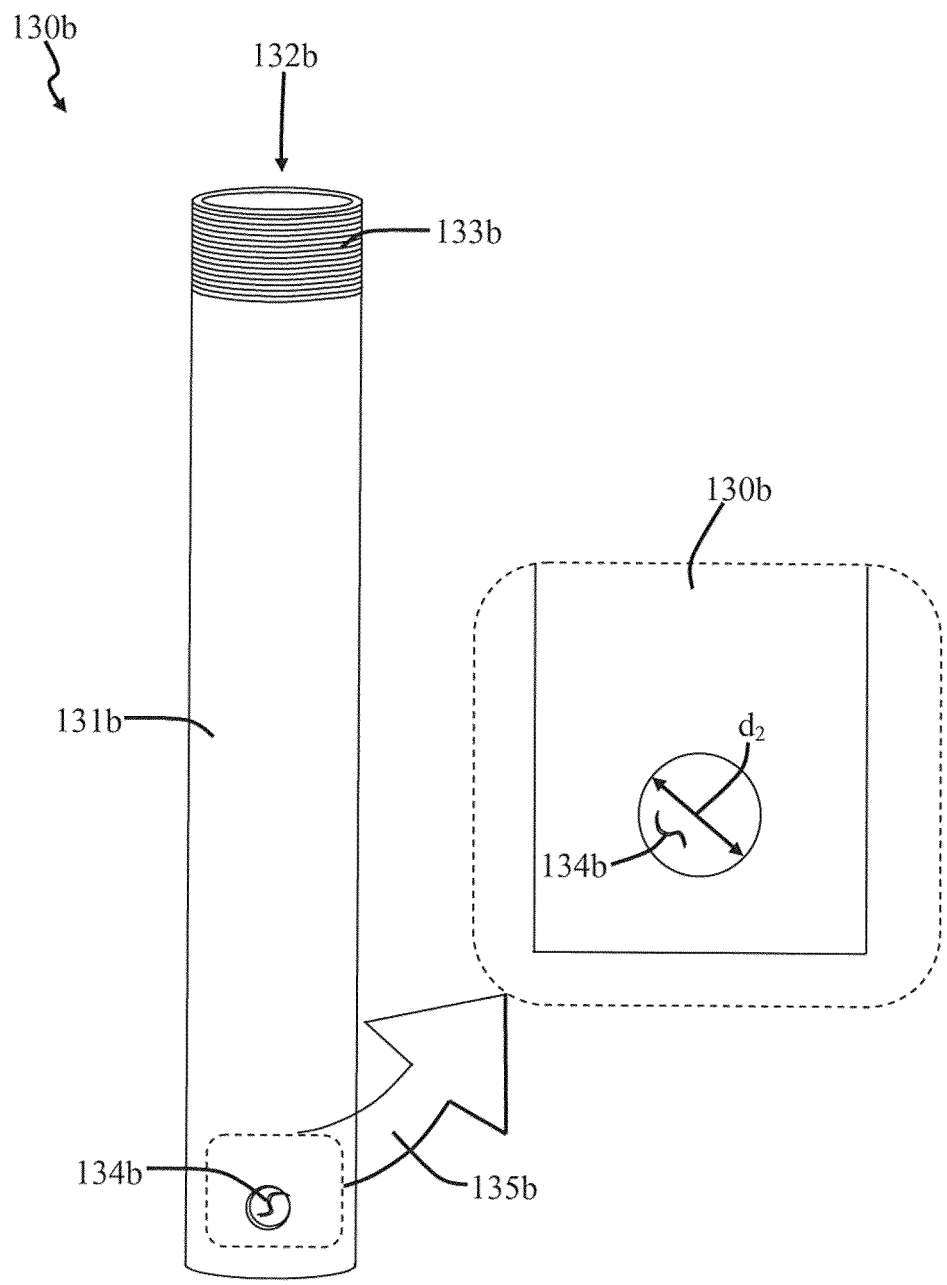
FIG. 4F is a perspective view of one embodiment of and electrode housing of the electrode assembly of FIG. 4A.

FIGS. 3D and 3E are top and bottom perspective views, respectively, of one embodiment of electrode cap 125a. In this embodiment, electrode cap 125a includes an electrode cap body 126a, wherein electrode cap body 126a includes an electrode terminal opening 127a at one end and electrode cap threads 128a at an opposed end. Electrode terminal opening 127a is sized and shaped so that electrode terminal 123a can extend therethrough, and electrode cap threads 128a allow electrode cap 125a to be threadingly engaged with electrode housing body 130a, as will be discussed in more detail presently.

Electrode cap 125a includes a material that is resistant to the chemicals of the reactant liquid and reactant gas. There are many different types of materials that are resistant to the chemicals of the reactant liquid and reactant gas, such as a plastic. There are many different types of plastics available, such as polypropylene and polyvinyl chloride. It should be noted that the material of electrode cap 125a is insulative. In general, the material of electrode cap 125a is more insulative than the material of electrode 122a.

FIG. 3F is a perspective view of one embodiment of electrode housing 130a. In this embodiment, electrode housing 130a includes an electrode housing body 131a, wherein electrode housing body 131a includes an electrode opening 132a at one end and an electrode housing body opening 134a at an opposed end. In this embodiment, electrode opening 132a faces longitudinally along electrode housing body 131a and electrode housing body opening 134a faces radially.

Electrode housing body 130a includes electrode housing body threads 133a proximate to electrode opening 132a. Electrode housing body threads 133a allow electrode cap 125a to be threadingly engaged with electrode housing body 130a. In particular, electrode housing body threads 133a can be threadingly engaged with electrode cap threads 128a. In this way, electrode housing body 130a and electrode cap 125a are repeatably moveable between engaged and disengaged conditions with each other.

As indicated by an indication arrow 135a, electrode housing body opening 134a is circular in shape and has a dimension $d_1$ which corresponds with its diameter. It should be noted, however, that electrode housing body opening 134a can have other shapes, such as rectangular and triangular. As will be discussed in more detail below, the flow of reactant ions through electrode housing body opening 134a increases and decreases in response to dimension $d_1$ being larger and smaller, respectively. In this way, dimension $d_1$ can be chosen to provide a desired flow of reactant ions through electrode housing body 130a.

Electrode housing body 130a includes a material that is resistant to the chemicals of the reactant liquid and reactant gas. There are many different types of materials that are resistant to the chemicals of the reactant liquid and reactant gas, such as a plastic. There are many different types of plastics available, such as polypropylene and polyvinyl chloride. It should be noted that the material of electrode housing body 130a is insulative. In general, the material of electrode housing body 130a is more insulative than the material of electrode 122a.

FIG. 5A is a diagram of a circulation system 100c which flows a fluid in a circuit 108. In this embodiment, circulation system 100c includes power supply 110 in communication with gas generating system 140 through power cord 111. As discussed in more detail above, gas generating system 140 includes electrode assembly 120 with electrodes 122a and 122b in communication with liquid region 107 (FIG. 1B). Gas generating system 140 includes gaseous region 106, and provides a reactant gas $S_1$ through conduit 101. Hence, reactant gas $S_1$ flows between gas generating system 140 and pool pump 170 through conduit 101.

In this embodiment, circulation system 100c includes a pool pump 170 in fluid communication with gas generating system 140. In particular, pool pump 170 is in fluid communication with gaseous region 106 through conduit 101 and receives reactant gas $S_1$. Reactant gas $S_1$ can be of many different types, such as those discussed in more detail above. Further, pool pump 170 can be of many different types. One embodiment of pool pump 170 is discussed in more detail with FIG. 5B.

In this embodiment, pool pump 170 receives an untreated fluid $S_2$ through a conduit 103 and provides a gassified and strained fluid $S_3$. Fluid $S_3$ is gassified in response to reactant gas $S_1$ being combined with untreated fluid $S_2$. Further, fluid $S_3$ is strained in response to flowing through pool pump 170. In this embodiment, reactant gas $S_1$ is combined with untreated fluid $S_2$ in pool pump 170, as will be discussed in more detail below.

In this embodiment, circulation system 100c includes a pool 190 in fluid communication with pool pump 170. In particular, pool 190 is in fluid communication with pool pump 170 through conduit 103 and provides untreated fluid $S_2$. Hence, untreated fluid $S_2$ flows between pool pump 170 and pool 190 through conduit 103.

As discussed in more detail below, untreated fluid $S_2$ includes water and contaminants, wherein it is desirable to remove the contaminants therefrom and return the water to pool 190. The contaminants can be of many different types, such as particles, algae and bacteria. The particles can be of many different types, such as dirt and debris. The debris can be of many different types, such as leaves. One embodiment of pool 190 is discussed in more detail with FIG. 5D.

In this embodiment, circulation system 100c includes a pool filter 180 in fluid communication with pool pump 170. In particular, pool filter 180 is in fluid communication with pool pump 170 through a conduit 104 and receives gassified and strained fluid $S_3$. Hence, gassified and strained fluid $S_3$ flows between pool pump 170 and pool filter 180 through conduit 104.

Pool filter 180 is in fluid communication with pool 190. In particular, pool filter 180 is in fluid communication with pool 190 through a conduit 105 and provides a treated, strained and filtered fluid $S_4$ to pool 190. Hence, treated, strained and filtered fluid $S_4$ flows between pool filter 180 and pool 190 through conduit 105. Fluid $S_4$ is treated and filtered in response to flowing through pool filter 190, and fluid $S_4$ is strained in response to flowing through pool pump 170. Pool filter 180 can be of many different types. One embodiment of pool filter 180 is discussed in more detail with FIG. 5C.

In operation, reactant gas $S_1$ is provided to pool pump 170 through conduit 101 in response to the operation of gas generating system 140. Further, untreated fluid $S_2$ flows to pool pump 170 through conduit 103 in response to the operation of pool pump 170. Reactant gas $S_1$ and untreated fluid $S_2$ are combined and strained in pool pump 170, and gassified and strained fluid $S_3$ is formed in response.

Gassified and strained fluid $S_3$ flows to pool filter 180 through conduit 104, in response to the operation of pool pump 170, and is treated and filtered so that treated, strained and filtered fluid $S_4$ is formed in response. Treated, strained and filtered fluid $S_4$ flows to pool 190 through conduit 105, in response to the operation of pool pump 170, to complete circuit 108.

Figure 5B:
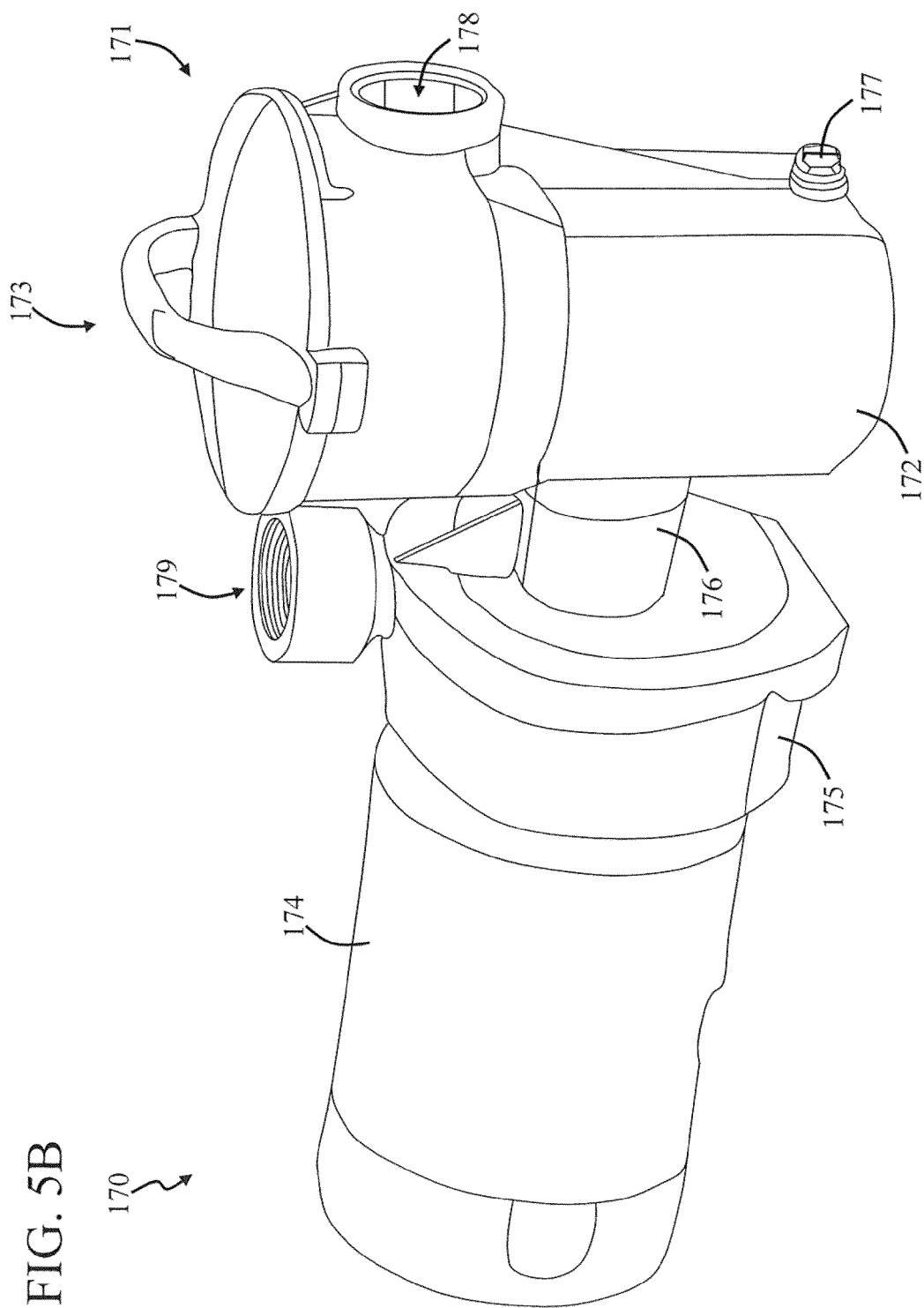
FIG. 5B is a perspective view of one embodiment of a pool pump of the system of FIG. 5A.

FIG. 5B is a perspective view of one embodiment of pool pump 170 of circulation system 100c. In this embodiment, pool pump 170 includes a pump strainer assembly 171 in fluid communication with an impeller housing 175 through a conduit 176. In this embodiment pump strainer assembly 171 includes a strainer pot 172 and strainer lid 173, wherein strainer pot 172 houses a strainer basket (not shown). Strainer pot 172 includes a pump influeunt line 178 proximate to strainer lid 173, and a strainer drain 177 away from strainer lid 173. Pump influeunt line 178 is in fluid communication with conduit 176 through the strainer basket so that a fluid flowing therebetween is strained. The fluid is strained because the strainer basked removes debris, such as leaves, therefrom.

In this embodiment, pool pump 170 includes an impeller (not shown) operatively coupled to a pump motor 174 through a pump shaft (not shown), wherein the impeller is positioned in impeller housing 175. When pool pump 170 has an on condition, pump motor 174 drives the pump shaft and the impeller rotates in response. Further, when pool pump 170 has an off condition, pump motor 174 does not drive the pump shaft and the impeller does not rotate in response. Pool pump 170 is repeatably moveable between the on and off conditions. In some situations, pool pump 170 is repeatably moveable between the on and off conditions in response to the operation of a timer.

Pool pump 170 includes a pump outfluent line 179, wherein pump outfluent line 179 extends from impeller housing 175. Pump outfluent line 179 is in fluid communication with conduit 176 through impeller housing 175. Hence, pump outfluent line 179 is in fluid communication with pump influeunt line 178 through the strainer basket, conduit 176 and impeller housing 175. The fluid flows between pump influeunt line 178 and pump outfluent line 179 in response to the rotation of the impeller. Further, fluid flows between strainer drain 177 and pump outfluent line 179 in response to the rotation of the impeller.

In operation, strainer drain 177 is coupled to gas generating system 140 through conduit 101 (FIG. 5A) so that reactant gas $S_1$ flows through strainer drain 177. Reactant gas $S_1$ flows between strainer drain 177 and pump outfluent line 179 through conduit 176 in response to the rotation of the impeller.

Pump influeunt line 178 is coupled to pool 190 through conduit 104 (FIG. 5A) so that untreated fluid $S_2$ flows through pump influeunt line 178. Untreated fluid $S_2$ flows between pump influeunt line 178 and pump outfluent line 179 through the strainer basket and conduit 176 in response to the rotation of the impeller.

It should be noted that reactant gas $S_1$ is combined with untreated fluid $S_2$ so that untreated fluid $S_2$ is gassified in response. It should also be noted that the impeller of impeller housing 175 can facilitate the combining of reactant gas $S_1$ and untreated fluid $S_2$. In this way, untreated fluid $S_3$ is gassified in response to flowing through pool pump 170. Further, untreated fluid $S_2$ flows through the strainer basket so that it is strained in response. In this way, untreated fluid $S_2$ is strained in response to flowing through pool pump 170.

Gassified and strained fluid $S_3$ is formed in response to untreated fluid $S_2$ being strained and combined with reactant gas $S_1$. Gassified and strained fluid $S_3$ flows through pump outfluent line 179 in response to the rotation of the impeller. In this way, pool pump 170 operates as a pump. Gassified and strained fluid $S_3$ flows to pool filter 180 through pump outfluent line 179 and conduit 103, as will be discussed in more detail presently.

Figure 5C:
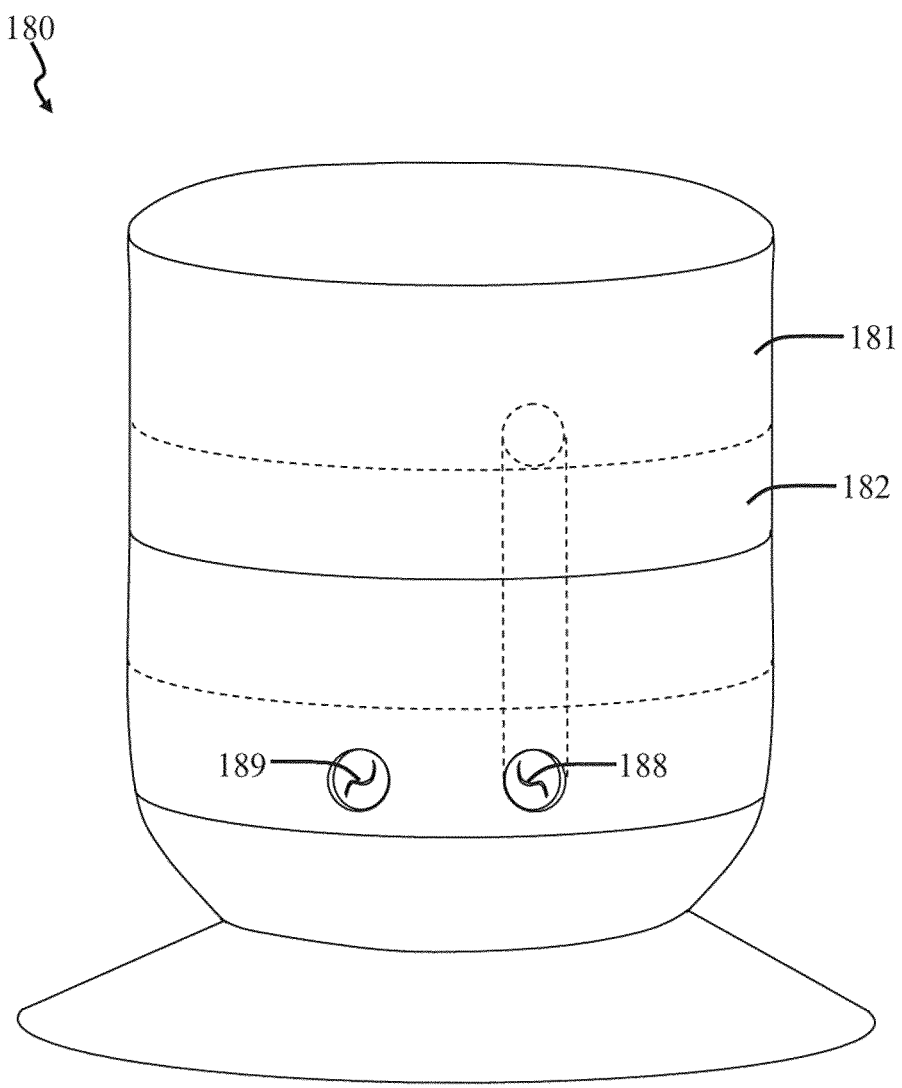
FIG. 5C is a perspective view of one embodiment of a pool filter of the system the system of FIG. 5A.

FIG. 5C is a perspective view of one embodiment of pool filter 180 of circulation system 100c. In this embodiment, pool filter 180 includes a pool filter body 181 with a filter influent line 188 and filter outfluent line 189. In this embodiment, filter influent line 188 is in fluid communication with pool pump 170. In particular, conduit 103 is coupled to pump outfluent line 179 (FIG. 5B) and filter influent line 188 so that gassified and strained fluid $S_3$ flows therebetween.

In this embodiment, filter outfluent line 189 is in fluid communication with pool 190 (FIG. 5A). In particular, conduit 105 is coupled to filter outfluent line 189 (FIG. 5B) and pool 190 so that treated, strained and filtered fluid $S_4$ flows therebetween, as shown in FIG. 5A. It should be noted that pool filter 180 includes a filtering material 182, wherein the fluid flowing between filter influent line 188 and filter outfluent line 189 flows through filtering material 182. Filtering material 182 can be of many different types. In this embodiment, filtering material 182 includes sand so that pool filter 180 operates as a sand filter. A sand filter uses a sand material to filter the fluid. It should be noted that pool filter 180 can be of many different types of filters, such as a cartridge pool filter, diatomaceous earth (DE) pool filter, a charcoal filter and a mineral filter. A cartridge filter typically uses a spun polyester material to filter the fluid. A DE pool filter uses a material commonly referred to as diatomaceous earth to filter the fluid. A charcoal filter uses a material commonly referred to as diatomaceous earth to filter the fluid. A mineral filter uses a mineral material, such as calcium, magnesium, potassium and/or sodium, to filter the fluid.

Filtering material 182 filters gassified and strained fluid $S_3$ in response to gassified and strained fluid $S_3$ flowing between filter influent line 188 and filter outfluent line 189 so that treated, strained and filtered fluid $S_4$ is formed in response. Gassified and strained fluid $S_3$ is filtered in response to the sand removing contaminants from the water. The contaminants can be of many different types, such as debris, algae and/or bacteria. Hence, gassified and strained fluid $S_3$ of filter influent line 188 includes more contaminants than treated, strained and filtered fluid $S_4$ of outfluent line 189.

It should be noted that the species of reactant gas $S_2$ is typically filtered by the sand of pool filter 180 so that treated, strained and filtered fluid $S_4$ of outfluent line 189 includes less of the species than gassified and strained fluid $S_3$. Hence, the sand of pool filter 180 restricts the amount of reactants species that flows between filter influent line 188 and filter outfluent line 189. This is desirable because it is desirable to restrict the amount of the species that is flowed to pool 190. In this way, a person using pool 190 is exposed to a reduced amount of the reactant species. It should be noted that, in other systems, the contaminants are reduced by introducing a reactant species, such as chlorine, in the pool 190. In this way, the person using pool 190 is undesirably exposed to a significant amount of the chlorine.

It should be noted that the contaminants are typically held by the sand, and reactant gas $S_2$ of gassified and strained fluid $S_3$ treats the contaminants of the sand. For example, the sand holds the algae and bacteria of gassified and strained fluid $S_3$, and reactant gas $S_2$ reduces their effectiveness. Reactant gas $S_2$ can reduce the effectiveness of algae and bacteria in many different ways. For example, in some situations, reactant gas $S_2$ reduces the ability of the algae and/or bacteria to reproduce. In some situations, reactant gas $S_2$ kills the algae and/or bacteria. In this way, treated, strained and filtered fluid $S_4$ is formed.

It should be noted that reactant gas $S_2$ is in pool filter 180 when pool pump 170 in the off condition. Hence, reactant gas $S_2$ treats the contaminants of the sand when pool pump 170 has the off condition. This is useful so that the effectiveness of the algae and bacterial can be reduced when the pool pump has the on and off condition.

FIG. 5D is a perspective view of one embodiment of pool 190 of circulation system 100*c*. In this embodiment, pool 190 includes a pool basin 191 having a basin opening 192, wherein pool basin 191 extends through a pool deck 194. Pool basin 191 holds a body of water 193. It should be noted that body of water 193 can correspond to the body of water discussed above.

In this embodiment, pool 190 includes inlets 196 and 197 are in fluid communication with pool filter 180 through conduit 105. In particular, conduit 105 is coupled to filter outfluent line 188 and inlets 196 and 197. Further, pool 190 includes a drain 198 and skimmer 195 which are in fluid communication with pool pump 170 through conduit 104. In particular, conduit 105 is coupled to pump influent line 178 and drain 198 and skimmer 195.

Figure 5E:
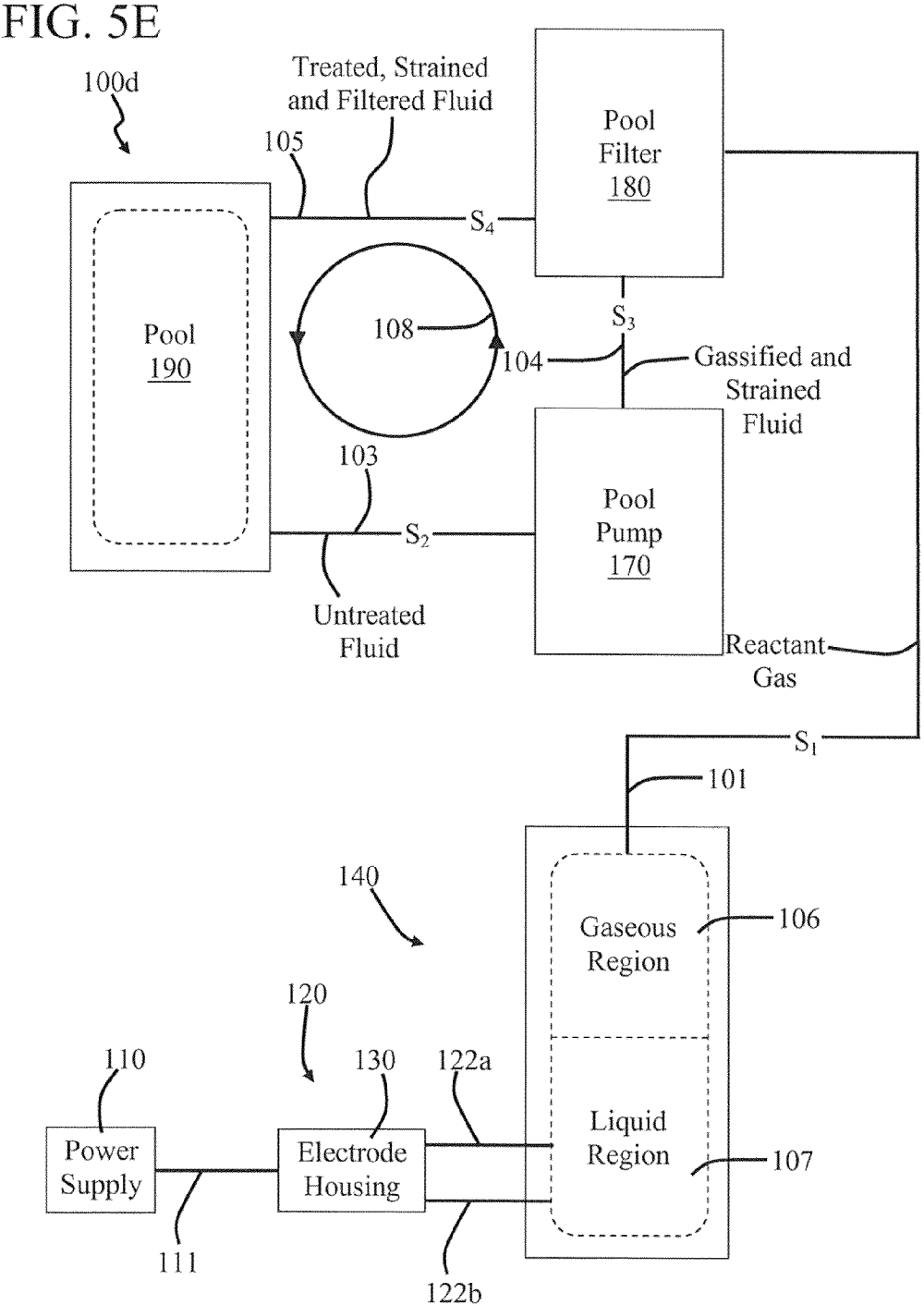

It should be noted that reactant gas $S_1$ can be introduced into pool 190 in many other ways. For example, FIG. 5E is a diagram of a liquid cleaning system 100*d*, wherein conduit 101 is coupled between gas generating system 140 and pool filter 180. In this way, reactant gas $S_1$ flows through conduit 101 between gas generating system 140 and pool filter 180. In this embodiment, conduit 101 can be coupled to pool filter 180 so that it is in fluid communication with filter influent line 188 and/or filter outfluent line 189.

FIG. 5F is a diagram of a liquid cleaning system 100*e*, wherein conduit 101 is coupled between pool 190 and gas generating system 140. In this way, reactant gas $S_1$ flows through conduit 101 between gas generating system 140 and pool 190.

It should be noted that conduit 101 can be coupled between gas generating system 140 and many other locations of liquid cleaning system 100*c* of FIG. 5A. For example, conduit 101 can be coupled between gas generating system 140 and conduit 104. Further, conduit 101 can be coupled between gas generating system 140 and conduit 105. It should be noted that gas generating systems can include conduit 101 coupled between gas generating system 140 and a plurality of other locations. For example, in some embodiments, conduit 101 is coupled to gas generating system 140 and pool pump 170 and conduit 101. In other embodiments, conduit 101 is coupled to gas generating system 140 and pool pump 170 and pool filter 180. In some embodiments, conduit 101 is coupled to gas generating system 140 and pool pump 170, pool filter 180 and pool 190.

FIGS. 6A and 6B are side views of another embodiment of a gas generating system, which is denoted as gas generating system 240. Gas generating system 240 can be used in liquid cleaning system 100*b* of FIG. 1B. For example, gas generating system 240 can replace gas generating system 140 of FIG. 1B. Gas generating system 240 includes liquid region 107 and gaseous region 106, which are described in more detail above.

In this embodiment, gas generating system 240 includes electrode assemblies 120*a* and 120*b*. Electrode assemblies 120*a* and 120*b* include electrode terminals 123*a* and 123*b*, respectively, as shown in FIG. 6A. Electrode assemblies 120*a* and 120*b* include electrodes 122*a* and 122*b*, respectively, which extend through gas region 106 and terminate in liquid region 107, as described in more detail above.

In this embodiment, gas generating system 240 includes a vessel lid 250 carried by a vessel 241. Electrode terminals 123*a* and 123*b* extend through vessel lid 250. Vessel 241 and vessel lid 250 can include many different materials. Vessel 241 and vessel lid 250 include a material that is resistant to the chemicals of the reactant liquid and reactant gas. There are many different types of materials that are resistant to the chemicals of the reactant liquid and reactant gas, such as a plastic. There are many different types of plastics available, such as polypropylene and polyvinyl chloride.

Vessel 241 can be of many different types. In this embodiment, vessel 241 includes a vessel body 242, which includes a vessel base 243 at one end and a vessel body opening 244 (FIG. 6B) at an opposed end. Vessel base 243 supports vessel body 242 in an upright position so that vessel body opening 244 faces upwardly. It should be noted that, in some embodiments, vessel base 243 and vessel body 242 are repeatably moveable between coupled and uncoupled conditions. Vessel base 243 and vessel body 242 are shown in the coupled condition in FIG. 6B. In other embodiments. vessel base 243 and vessel body 242 are a single integral piece.

In this embodiment, vessel lid 250 includes a vessel lid base 251 and vessel lid dome 252. Vessel lid 250 is repeatably moveable between positions engaged with and disengaged from vessel body 242, wherein vessel lid 250 is engaged with vessel body 242 in FIGS. 6A and 6B, and vessel lid 250 is disengaged from vessel body 242 in FIG. 6B. It should be noted that vessel lid 250 covers vessel body opening 244 when it is engaged with vessel body 242.

Figure 6C:
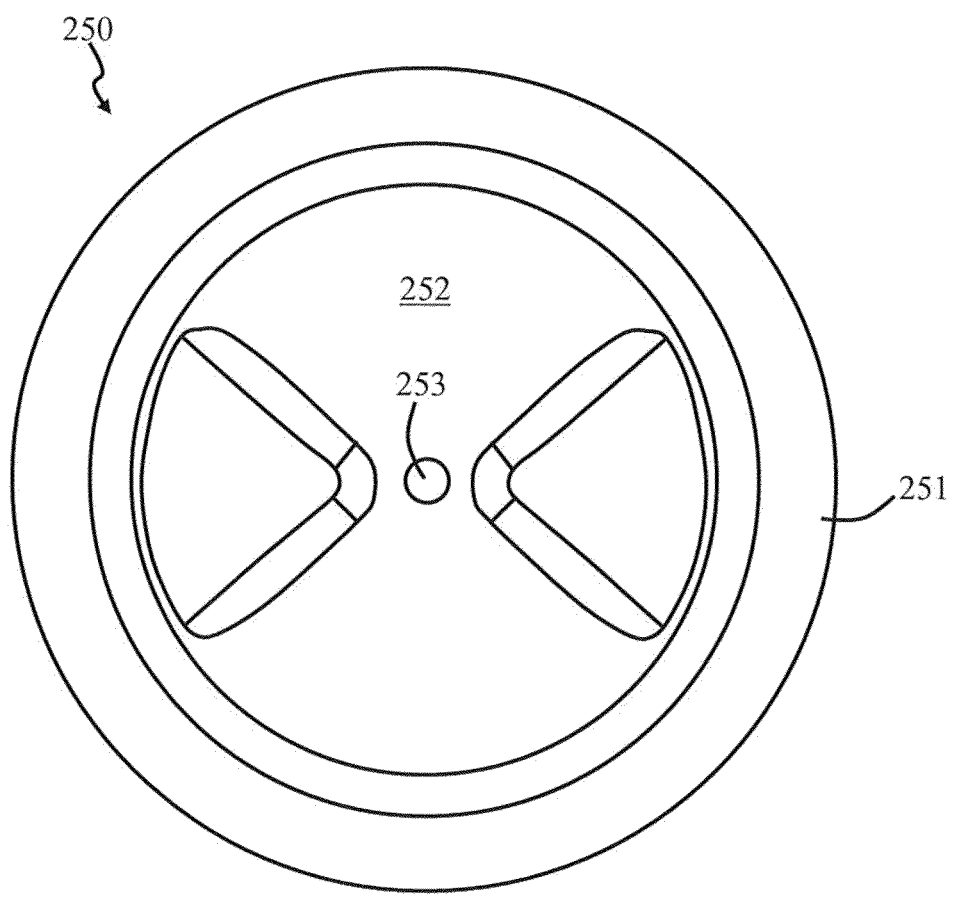
FIG. 6C is a top plan view of a vessel lid of the gas generating system of FIGS. 6A and 6B.

FIG. 6C is a top plan view of vessel lid 250. In this embodiment, vessel lid 250 includes a gas output port 253, which extends through vessel lid dome 252. Gas output port 253 is sized and shaped to receive a conduit, such as conduit 101 (FIG. 5A).

Figure 6D:
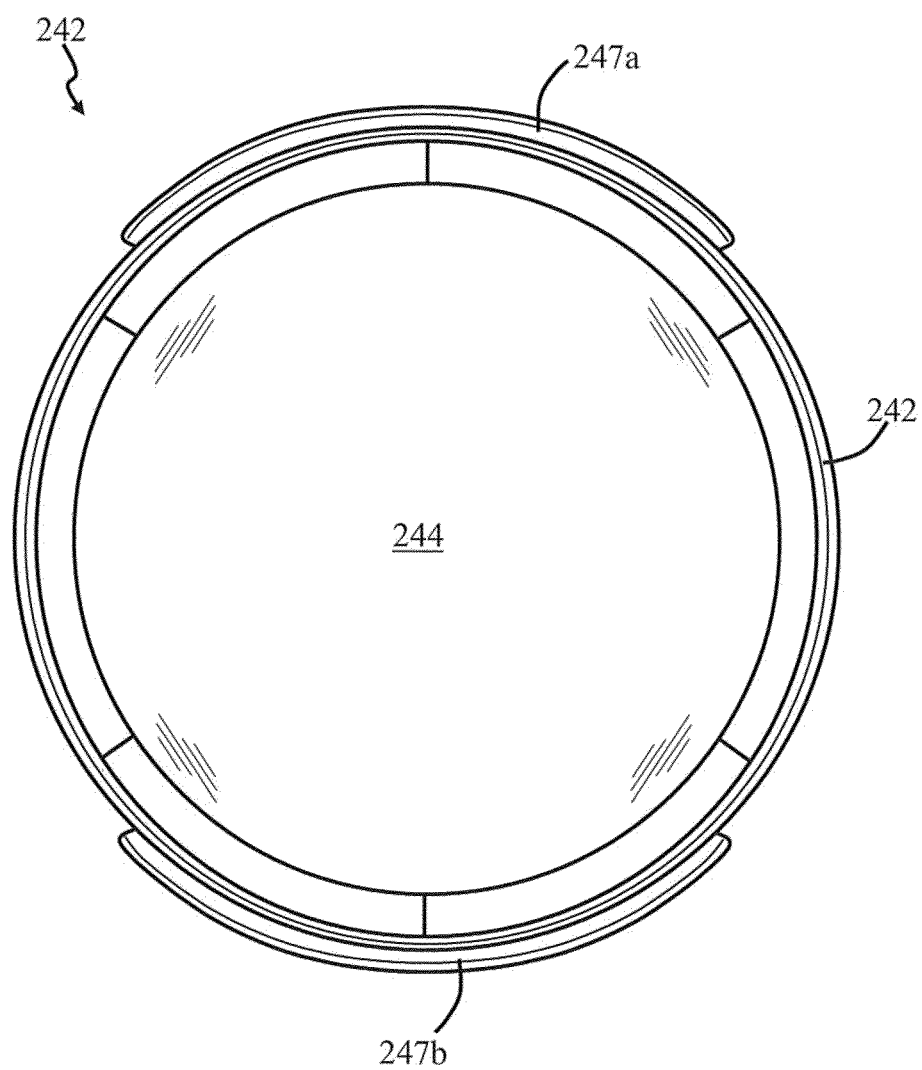
FIG. 6D is a top plan view of the vessel of the gas generating system of FIGS. 6A and 6B.

In the embodiments of FIGS. 6A and 6B, vessel lid 250 is engaged with vessel body 242 in response to coupling an inner periphery of vessel lid 250 with outwardly extending lips 247*a* and 247*b*. In this embodiment, outwardly extending lips 247*a* and 247*b* are included with vessel 241, and extend partially around vessel body 242, as shown in FIG. 6D, wherein FIG. 6D is a top plan view of vessel body 242. Outwardly extending lips 247*a* and 247*b* extend partially around vessel body 242 so that a seal is not formed between vessel lid 250 and vessel body 242. A seal is not formed between vessel lid 250 and vessel body 242 so that the reactant gas can vent therebetween vessel lid 250 and vessel body 242. In this way, gas generating system 240 does not need to have a gas vent, such as gas vent 154 of FIGS. 2A, 2B and 2C. It should be noted that vessel lid 250 can be held to vessel body 242 in many other ways. For example, vessel lid 250 can be engaged with threads of vessel body 242, wherein the threads extend annularly around vessel body 242.

In the embodiment of FIGS. 6A and 6B, vessel body 242 is a single integral piece of material. However, it should be noted that vessel body 242 includes vessel body sections 242*a*, 242*b* and 242*c*, wherein vessel body section 242*a* is positioned proximate to vessel base 243, vessel body section 242c is positioned proximate to vessel lid 250 and vessel body section 242b is positioned between vessel body sections 242a and 242c.

In this embodiment, vessel body section 242a includes outwardly extending lips 245a and 245b, vessel body section 242b includes outwardly extending lips 246a and 246b and vessel body section 242c includes outwardly extending lips 247a and 247b. Outwardly extending lips 245a and 245b are positioned away from vessel base 243 and proximate to vessel body portion 242b. Outwardly extending lips 246a and 246b are positioned away from outwardly extending lips 245a and 245b and proximate to vessel body portion 242c. Outwardly extending lips 247a and 247b are positioned away from outwardly extending lips 246a and 246b and proximate to vessel lid 250.

Figure 6E:
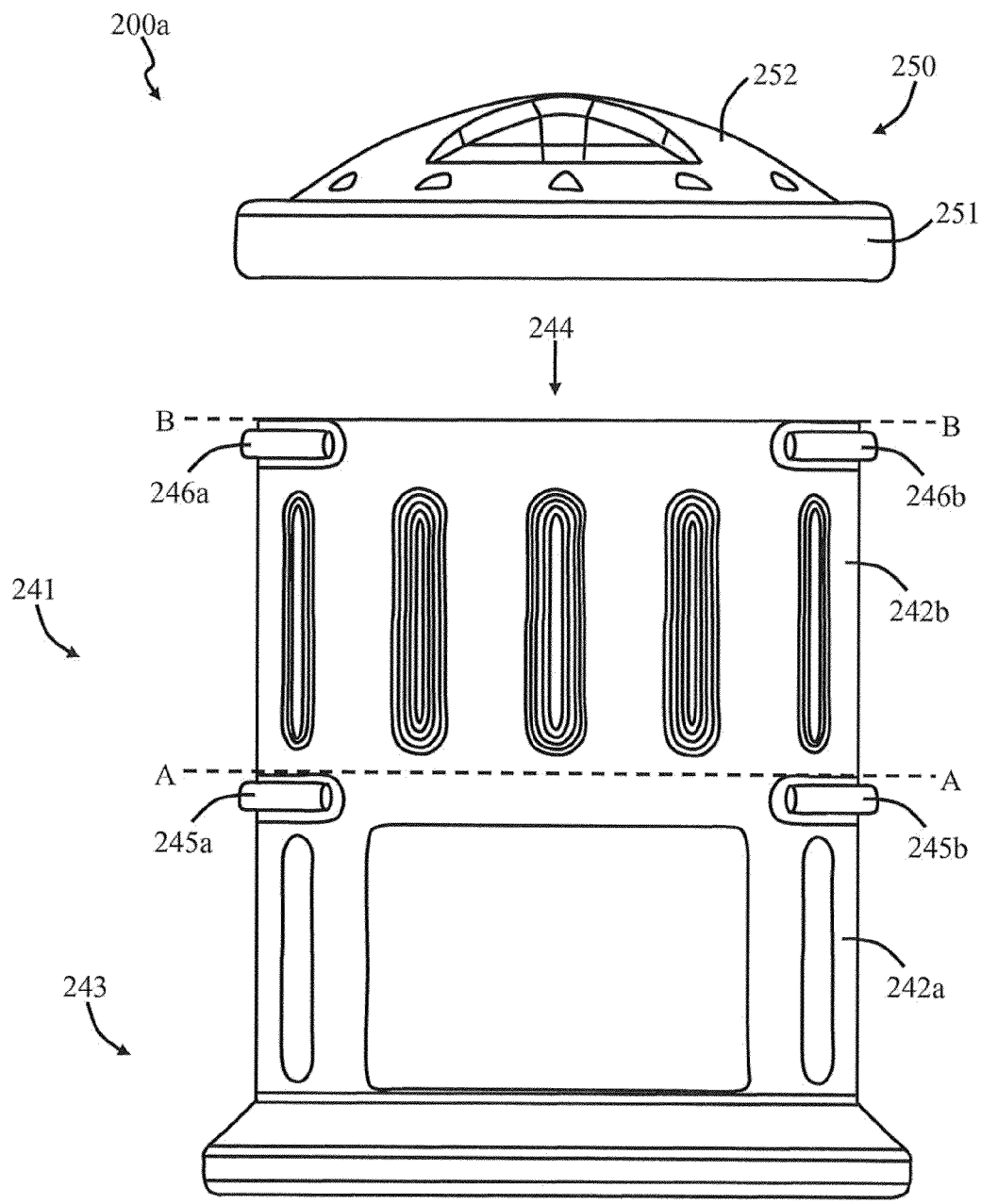

The size of gas generating system 240 is adjustable in response to adjusting the size of vessel body 242. The size of vessel body 242 can be adjusted in many different ways. In one embodiment, vessel body 242 can be cut through a cut-line B-B (FIG. 6A) to form a gas generating system 200a, which includes vessel body sections 242a and 242b, as shown in FIG. 6E. In this embodiment, vessel lid 250 is engaged with vessel body section 242b in response to coupling the inner periphery of vessel lid 250 with outwardly extending lips 246a and 246b. It should be noted that gas generating system 200a does not include vessel body section 242c because it has been removed from vessel body section 242b.

In another embodiment, vessel body 242 can be cut through a cut-line A-A (FIG. 6A) to form a gas generating system 200b, which includes vessel body section 242a, as shown in FIG. 6F. In this embodiment, vessel lid 250 is engaged with vessel body section 242a in response to coupling the inner periphery of vessel lid 250 with outwardly extending lips 245a and 245b. It should be noted that gas generating system 200b does not include vessel body sections 242b and 242c because they have been removed from vessel body section 242b. Vessel body sections 242b and 242c are typically removed from vessel body section 242a as a single integral piece.

It is useful to be able to adjust the size of gas generating system 240 because the desired size of gas generating system 240 depends on the amount of the fluid it is desired to treat. The desired size of gas generating system 240 increases and decreases as the amount of the fluid it is desired to treat increases and decreases, respectively. In one particular embodiment, gas generating system 240 holds about six gallons of reactant liquid in liquid region 107, gas generating system 240a holds about four gallons of reactant liquid in liquid region 107 and gas generating system 240b holds about two gallons of reactant liquid in liquid region 107. It should be noted that gas generating systems 240, 240a and 240b can hold other amounts of reactant liquid in liquid region 107, and six gallons, four gallons and two gallons is chosen for illustrative purposes.

It is useful to be able to adjust the size of gas generating system 240 by removing vessel body sections 242b and/or 242c so that a single mold can be used to form gas generating system 240. The ability to use a single mold to form gas generating system 240 is useful because it reduces manufacturing costs.

Figure 7A:
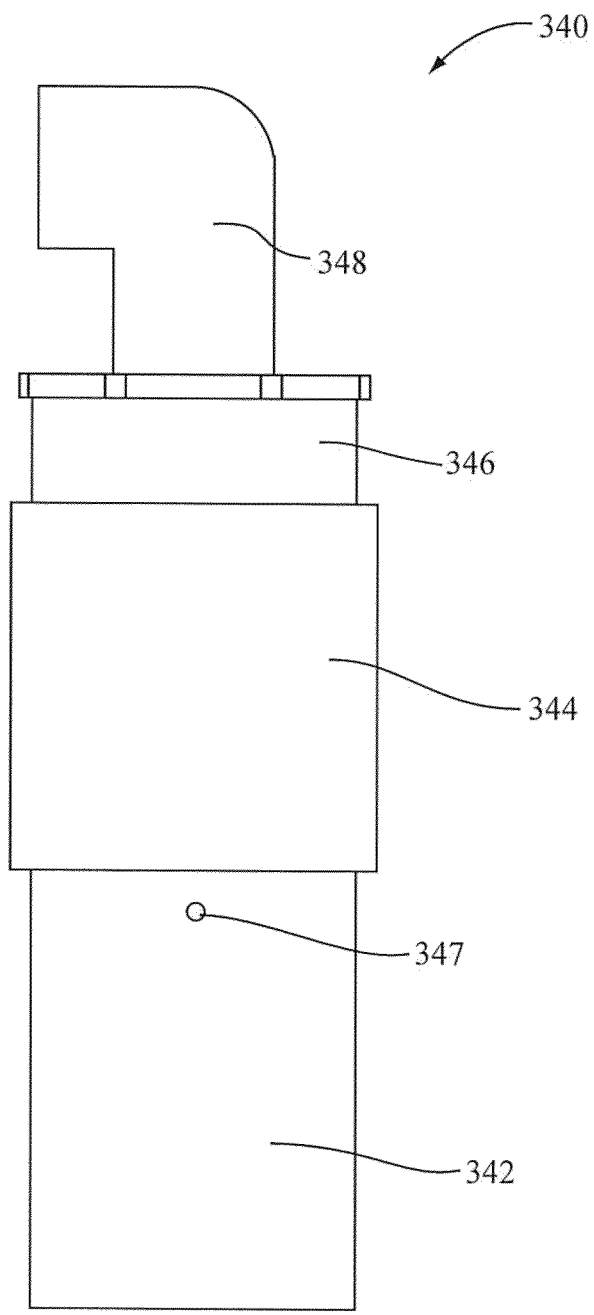
FIG. 7A is side view of an embodiment of a gas generation system.
Figure 7B:
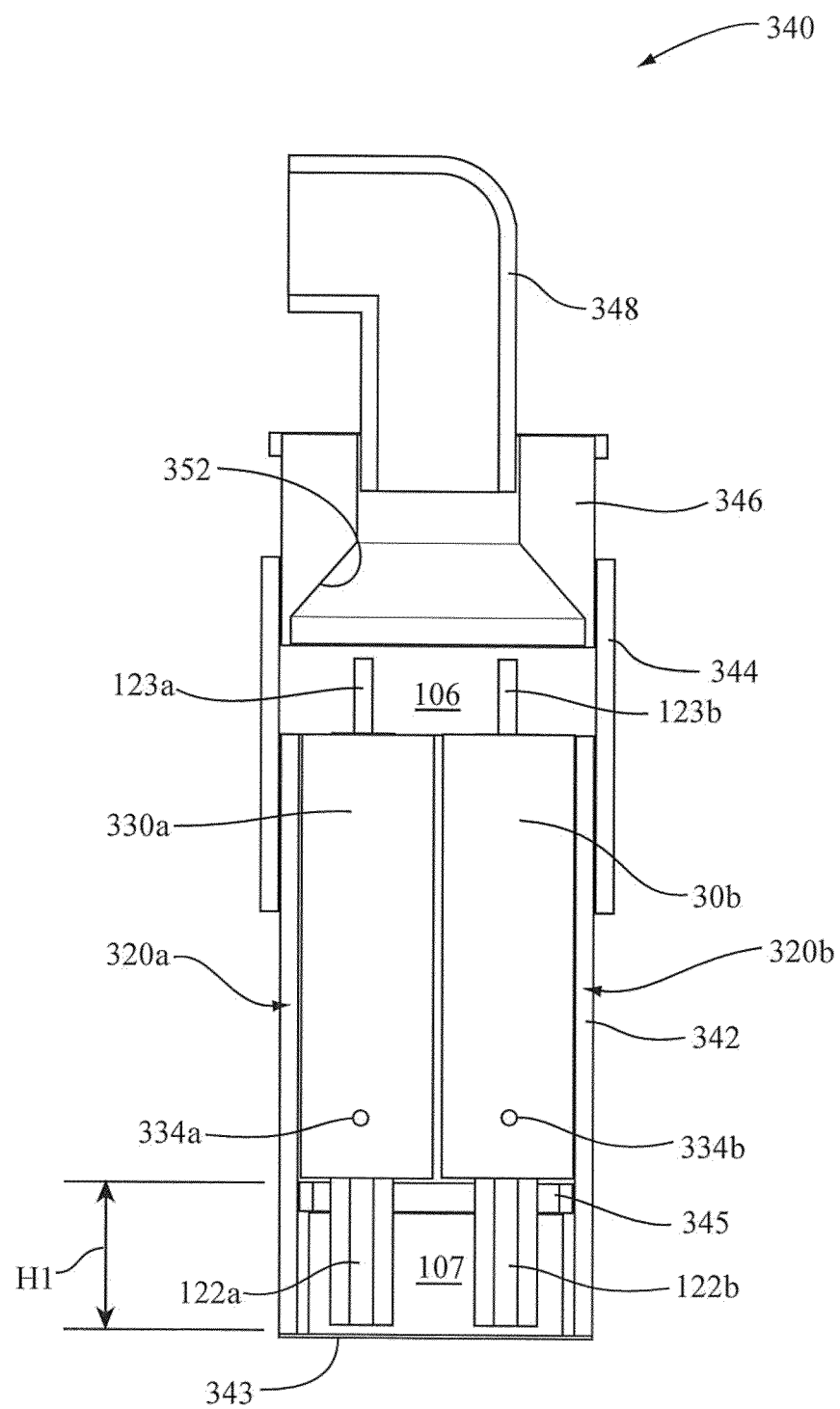
FIG. 7B is a section view of the embodiment of the gas generation system of FIG. 7A.
Figure 8A:
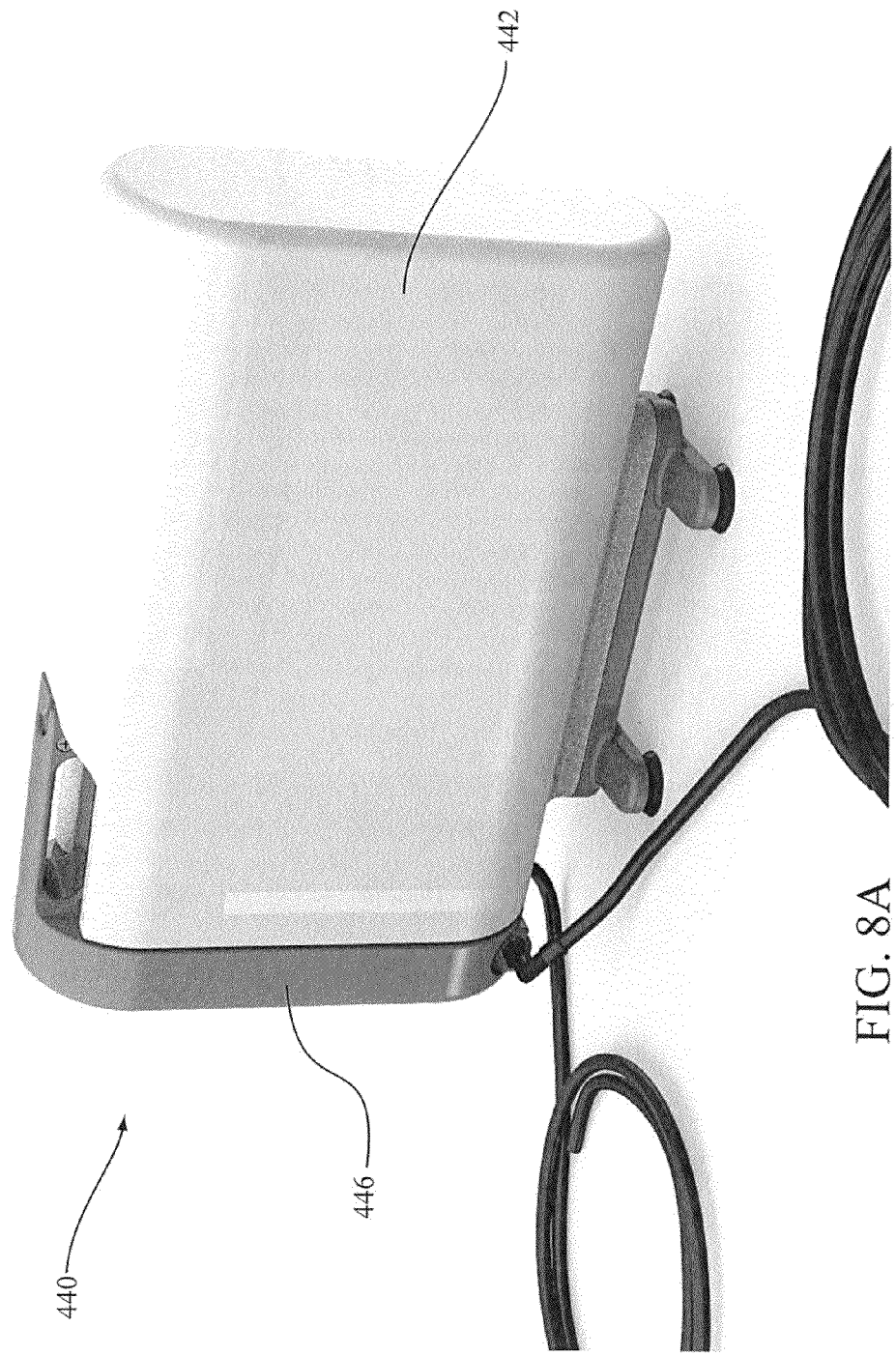
FIG. 8A is a perspective view of an embodiment of a gas generation system.
Figure 8B:
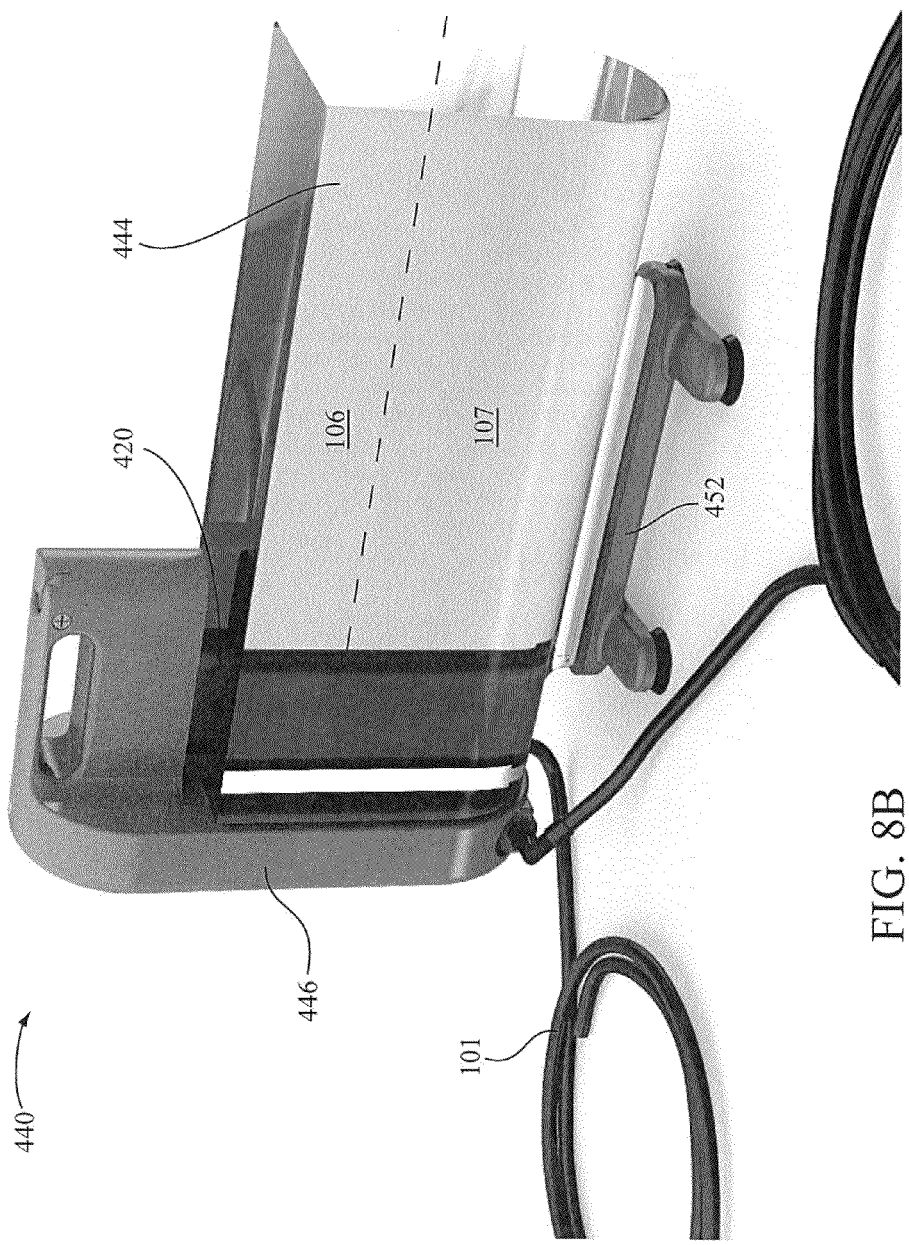
FIG. 8B is a perspective view of the internal components of the embodiment of FIG. 8A.
Figure 8C:
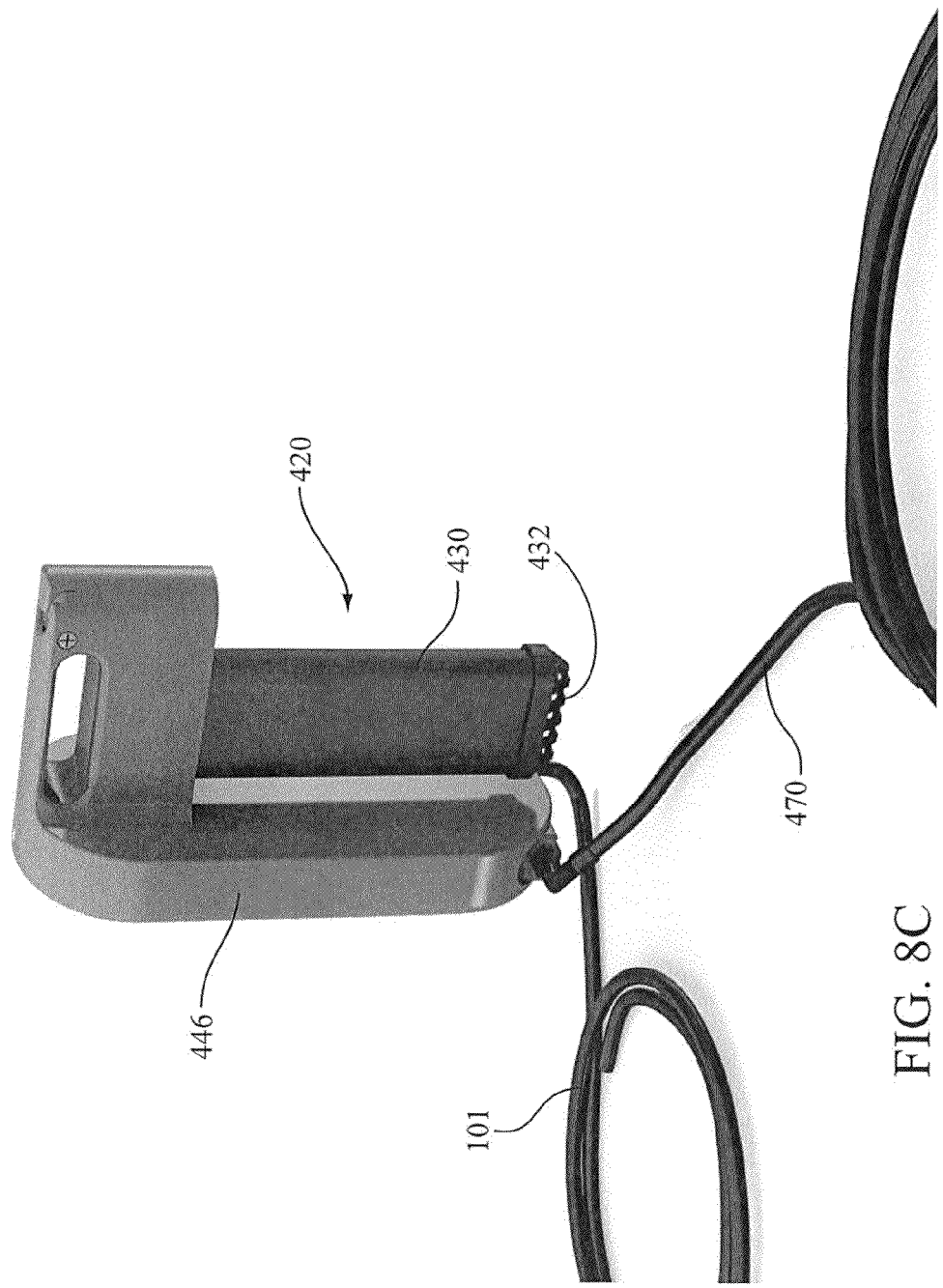
FIG. 8C is a perspective view of a portion of the components of the embodiment of FIG. 8A.
Figure 8D:
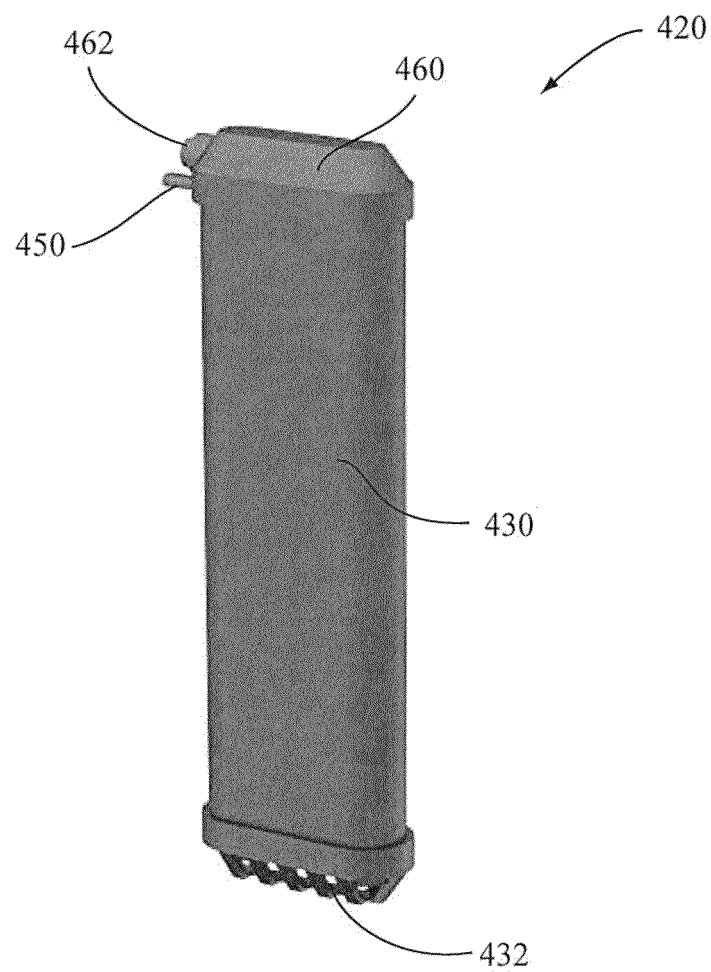
FIG. 8D is a perspective view of a cartridge used in the embodiment of FIG. 8A.

FIGS. 7A and 7B are side views of another embodiment of a gas generating system, which is denoted as gas generating system 340. Gas generating system 340 can be used in liquid cleaning system 100b of FIG. 1B. For example, gas generating system 340 can replace gas generating system 140 of FIG. 1B. Gas generating system 340 includes liquid region 107 and gaseous region 106, which are described in more detail above.

In this embodiment, gas generating system 340 includes electrode assemblies 120a and 120b. Electrode assemblies 320a and 320b include electrode terminals 123a and 123b, respectively, as shown in FIG. 7B. Electrode assemblies 320a and 320b include electrodes 122a and 122b, respectively, which extend through gas region 106 and terminate in liquid region 107, as described in more detail above.

In this embodiment, gas generating system 340 includes a vessel lid 346 carried by a vessel connector 344, wherein the vessel connector 344 is coupled to vessel 342. Electrode terminals 123a and 123b extend beyond the vessel 342 into vessel connector 344. Wires having terminal connectors (not shown) are coupled to the electrode terminals 123a and 123b. Vessel 342, vessel connector 344 and vessel lid 346 can include many different materials. Vessel 342, vessel connector 344 and vessel lid 346 include a material that is resistant to the chemicals of the reactant liquid and reactant gas. There are many different types of materials that are resistant to the chemicals of the reactant liquid and reactant gas, such as a plastic. There are many different types of plastics available, such as polypropylene and polyvinyl chloride.

Vessel 342 can be of many different types. For example, as shown the vessel 342 and the vessel connector 344 are shown as separate components, and in particular embodiments, the vessel 342 and the vessel connector 344 may be integral.

In this embodiment, vessel lid 346 is repeatably moveable between positions engaged with and disengaged from vessel connector 344, wherein in the engaged position, as shown in FIG. 7B, the gas generation system 340 is in a condition to operate and in the disengaged position, the gas generation system, 340 is in a condition to access inner components, such as, but not limited to the electrodes 122a and 122b.

In this embodiment, vessel lid 346 includes a gas output port 348, which extends into vessel lid dome 352. Gas output port 348 may also include an adapter that is sized and shaped to receive a conduit, such as conduit 101 (FIG. 5A), such that gas flows through the gas output port 348, through the adapter and into the conduit 101.

In this embodiment, electrode assembly 320a includes automatic adjusting electrode 122a, which extends through an electrode housing 330a such that an end of the electrode 122a contacts a screen 343 coupled to an end of vessel 342. The screen 343 is located on a bottom of the vessel 342, wherein gravity draws the electrode 122a into contact with the screen 343. The vessel body 342 comprises an inner annular ring 345, wherein the inner annular ring 345 functions to support the electrode housing 360a, to maintain a bottom of the electrode housing a distance H1 from the screen 343. This allows for a predetermined length of electrode 122a to extend from the bottom of the housing 330a.

Further, housing 330a may include drain aperture 334a, wherein the aperture 334a allows for unused gas to escape through aperture 334a in order to ensure that newly produced gas is utilized within the gas generating system 340. Additionally, the aperture 334a is small enough to inhibit an electrical connection with electrode 122b.

Further in this embodiment, electrode assembly 320b includes automatic adjusting electrode 122b, which extends through an electrode housing 330b such that an end of the electrode 122b contacts a screen 343 coupled to an end of vessel 342. The screen 343 is located on a bottom of the vessel 342, wherein gravity draws the electrode 122b into contact with the screen 343. The vessel body 342 comprises an inner annular ring 345, wherein the inner annular ring 345 functions to support the electrode housing 360b, to maintain a bottom of the electrode housing a distance H1 from the screen 343. This allows for a predetermined length of electrode 122b to extend from the bottom of the housing 330b.

Further, housing 330a may include drain aperture 334b, wherein the aperture 334b allows for unused gas to escape through aperture 334b in order to ensure that newly produced gas is utilized within the gas generating system 340. Additionally, the aperture 334b is small enough to inhibit an electrical connection with electrode 122a. Further, vessel 342 may also include a drain aperture 347, wherein the old unused gas can escape from the vessel.

In operation, the electrodes 122a and 122b operate as described in detail above. During gas generation, the electrodes 122a and 122b wear or erode on the ends contacting the screen 343. As it wears away, gravity continues to draw the electrodes 122a and 122b to contact the screen, thereby always ensuring that an end of the electrodes 122a and 122b extend into the fluid region. The electrodes 122a and 122b are not restricted in vertical movement within the housings 330a and 330b respectively. Accordingly, as gravitation acts on the electrodes 122a and 122b, the electrodes move vertically down until the bottom of the electrodes 122a and 122b contact the screen. In at least this way, the electrodes 122a and 122b are automatically adjusting electrodes.

In another embodiment shown in FIGS. 8A-8D, a gas generation system 440 is shown. Gas generating system 440 can be used in liquid cleaning system 100b of FIG. 1B. For example, gas generating system 440 can replace gas generating system 140 of FIG. 1B. Gas generating system 440 includes liquid region 107 and gaseous region 106, which are described in more detail above. Further, gas generation system 440 comprises vessel 442 and end cap 446, wherein the vessel 442 includes a reservoir 444 within the vessel 442. The end cap is configured to attach to an electrode cartridge 420, wherein the electrode cartridge extends through the gaseous zone 106 into the liquid zone 107. Further, the vessel 442 is carried by base 352.

The electrode cartridge 420 comprises an electrode housing 430 with a screen 432 located on a bottom portion and a cap 460 coupled to a top portion of the cartridge housing 430. Electrodes 122a and 122b are held within the cartridge housing 430. The cartridge housing 430 comprises inner compartments 434, wherein the inner compartments 434 separate and isolate the electrodes 122a and 122b, except for the portion extending beyond the compartment 434 and in contact with the screen 432. The electrodes 122a and 122b are automatically adjusting electrodes as described with respect to FIGS. 7A-7B.

The cap 460 further comprises a gas output port 462, that is adapted to couple to a conduit 101 (FIG. 5A), such that gas flows through the gas output port 348, through the adapter and into the conduit 101. Further the cap 460 comprises electrical connector 450, wherein the electrical connector 450 is in electrical contact with electrode terminals 123a and 123b, wherein the electrical connector 450 contacts a contact point within the end cap 446 of the gas generating system wherein in this contact connects the electrode terminals 123a and 123b to a power source through power cable 470.

The electrode cartridge 420 is a repeatably replacement cartridge, wherein as the electrodes 122a and 122b wear, they ultimately stop working when there is no longer an ability to establish potential difference between the electrodes. A user may then easily replace the electrode cartridge 420 in order for the gas generating system 440 to operate again.

Embodiments of the present invention, as shown in FIGS. 7A-8D, counter the natural occurrence of raising the pH in freshwater that is in a confined space. The turning of the earth contributes in driving up pH levels in freshwater that is in a confined space. Alkalinity is affected either up or down by base material or acidic material added to water that is in a confined space. Embodiments of the present invention triggers the effect of the scale of alkalinity up or down in order to keep it steady with in 60 ppm and 100 ppm, while balancing the pH within a range of 7.2 to 7.8. With the pH in this normal range the ions that are introduced into the water attaches to oxygen ion and do not destroy alkalinity, does not produce an odor, and reduces other side effects of water that is treated.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

The invention claimed is:

1. A pool cleaning system, comprising:
a gas generating system, having a vessel body and first and second electrode assemblies operatively retained within the vessel body, wherein a reactant gas is formed in response to establishing a potential difference between the first and second electrode assemblies, and wherein the first and second electrode assemblies each comprise:
an electrode housing; and
an automatic adjusting electrode moveable within the electrode housing, wherein the automatic adjusting electrodes adjust in response to wear of the electrode during forming of the reactant gas; and
a pool filter in fluid communication with the gas generating system, wherein the reactant gas is introduced into the pool filter.

2. The system of claim 1, wherein the pool filter includes a filtering material, and the reactant gas flows to the filtering material.

3. The system of claim 1, wherein the reactant gas flows to the pool filter through a pool pump.

4. The system of claim 3, wherein the gas generating system is in fluid communication with the pool filter through a strainer drain of the pool pump.

5. The system of claim 1, wherein the first and second electrode assemblies extend through a gaseous region.

6. The system of claim 5, wherein the distal ends of the first and second electrode assemblies are positioned in a liquid region.

7. The system of claim 6, wherein as the distal ends the first and second electrodes wear in response to forming of the reactant gas, the first and second electrodes automatically adjust down in position within the liquid region.

8. The system of claim 7, wherein the automatic adjustment of the first and second electrodes comprises gravitational force operating to draw the first and second electrodes down in position within the liquid region.

9. A pool cleaning system, comprising:
a pool pump;
a gas generating system, having a vessel body and first and second electrode assemblies operatively retained within the vessel body, wherein a reactant gas is formed in response to establishing a potential difference between the first and second electrode assemblies, and wherein the first and second electrode assemblies each comprise:
an electrode housing; and
an automatic adjusting electrode moveable within the electrode housing, wherein the automatic adjusting electrodes adjust in response to wear of the electrode during forming of the reactant gas; and a pool filter in fluid communication with the pool pump, wherein the reactant gas flows to the pool filter through the pool pump.

10. The system of claim 7, wherein the pool filter includes a filtering material, and the metal ion flows to the filtering material.

11. The system of claim 7, wherein the pool pump includes a strainer drain, and the reactant gas flows through the strainer drain.

12. The system of claim 7, wherein the gas generating system includes a liquid region which includes an acid.

13. The system of claim 10, wherein the distal ends of the first and second electrode assemblies are positioned in the acid.

14. The system of claim 13, wherein the electrode includes an electrode terminal connected to an electrode body.

15. The system of claim 14, wherein as the distal ends the first and second electrodes wear in response to forming of the reactant gas, the first and second electrodes automatically adjust down in position within the liquid region.

16. The system of claim 15, wherein the automatic adjustment of the first and second electrodes comprises gravitational force operating to draw the first and second electrodes down in position within the liquid region.

17. A cartridge for use in a pool cleaning system, the cartridge comprising:

an cartridge housing having a first inner compartment and a second inner compartment;

first and second automatically adjusting electrodes moveably retained within the first and second inner compartments, wherein the first and second inner compartments separate and isolate the first and second electrodes; and a screen coupled to bottom end of the cartridge housing, wherein distal ends of the first and second electrodes extending beyond the first and second compartment s and in contact with the screen.

18. The cartridge of claim 17, a cap coupled to a top end of the cartridge housing, the cap comprising a gas output port and an electrical connector.

19. The cartridge of claim 18, wherein the electrical connector is in electrical contact with first and second electrode terminals of the first and second electrodes, wherein the electrical connector connects the first and second electrode terminals to a power source.

20. The cartridge of claim 19, wherein as the distal ends the first and second electrodes wear in response to forming of a reactant gas when the cartridge is used in a gas generating system, the first and second electrodes automatically adjust down in position within a liquid region of the gas generating system.

* * * * *